United States Patent
Shao et al.

(10) Patent No.: US 12,463,785 B2
(45) Date of Patent: Nov. 4, 2025

(54) CONFIGURATION METHOD, COMMUNICATION NODE, AND STORAGE MEDIUM

(71) Applicant: ZTE Corporation, Guangdong (CN)

(72) Inventors: Shijia Shao, Guangdong (CN); Chuangxin Jiang, Guangdong (CN); Huahua Xiao, Guangdong (CN); Zhaohua Lu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 417 days.

(21) Appl. No.: 18/020,063

(22) PCT Filed: Aug. 6, 2021

(86) PCT No.: PCT/CN2021/111231
§ 371 (c)(1),
(2) Date: Feb. 6, 2023

(87) PCT Pub. No.: WO2022/028584
PCT Pub. Date: Feb. 10, 2022

(65) Prior Publication Data
US 2023/0291532 A1   Sep. 14, 2023

(30) Foreign Application Priority Data

Aug. 7, 2020 (CN) .......................... 202010790890.6

(51) Int. Cl.
*H04W 72/1268* (2023.01)
*H04L 5/00* (2006.01)
*H04W 72/21* (2023.01)

(52) U.S. Cl.
CPC ....... *H04L 5/0091* (2013.01); *H04W 72/1268* (2013.01); *H04W 72/21* (2023.01)

(58) Field of Classification Search
CPC ............ H04L 5/0091; H04W 72/1268; H04W 72/21; H04W 72/0446
See application file for complete search history.

(56) References Cited

U.S. PATENT DOCUMENTS

| 2020/0145169 A1* | 5/2020 | Zhou .................... H04W 72/20 |
| 2020/0314860 A1* | 10/2020 | Zhou .................... H04W 72/23 |
| 2023/0093264 A1* | 3/2023 | Gao ..................... H04W 52/16 370/329 |
| 2023/0134803 A1* | 5/2023 | Khoshnevisan .... H04W 52/367 370/329 |

(Continued)

FOREIGN PATENT DOCUMENTS

| CN | 110312318 A | 10/2019 |
| CN | 110536399 A | 12/2019 |

(Continued)

OTHER PUBLICATIONS

International Search Report dated Oct. 28, 2021, in connection with International Application No. PCT/CN2021/111231.

(Continued)

*Primary Examiner* — Fahmida S Chowdhury
(74) *Attorney, Agent, or Firm* — Wolf, Greenfield & Sacks, P.C.

(57) ABSTRACT

Provided are a configuration method, a communication node, and a storage medium. The configuration method includes: acquiring transmission indication information; and determining a spatial relation associated with an uplink control channel corresponding to the transmission indication information during repeated transmssions of the uplink control channel.

14 Claims, 8 Drawing Sheets

Acquire transmission indication information — S110

Determine a spatial relation associated with an uplink control channel corresponding to the transmission indication information during repeated transmissions of the uplink control channel — S120

(56) References Cited

U.S. PATENT DOCUMENTS

| | | | | |
|---|---|---|---|---|
| 2023/0156626 A1* | 5/2023 | Ling | H04W 52/325 | |
| | | | 455/522 | |
| 2023/0239878 A1* | 7/2023 | Deghel | H04L 1/08 | |
| | | | 370/329 | |
| 2023/0247617 A1* | 8/2023 | Matsumura | H04L 5/0051 | |
| | | | 370/329 | |
| 2023/0262707 A1* | 8/2023 | Matsumura | H04L 1/1864 | |
| 2023/0276446 A1* | 8/2023 | Matsumura | H04B 7/0695 | |
| | | | 370/329 | |
| 2023/0276447 A1* | 8/2023 | Matsumura | H04L 1/189 | |
| 2023/0291532 A1* | 9/2023 | Shao | H04L 5/0091 | |

FOREIGN PATENT DOCUMENTS

| | | |
|---|---|---|
| CN | 110536450 A | 12/2019 |
| CN | 110769502 A | 2/2020 |
| CN | 111092697 A | 5/2020 |
| CN | 111278120 A | 6/2020 |
| CN | 111901870 A | 11/2020 |
| CN | 111935835 A | 11/2020 |
| WO | WO 2020/143526 A1 | 7/2020 |

OTHER PUBLICATIONS

Extended European Search Report dated Jul. 26, 2024, in connection with European Application No. 21854199.3.

[No Author Listed], 3GPP Draft; List of RAN1 Agreements in 2018Q1. 3$^{rd}$ Generation Partnership Project (3GPP). Mobile Competence Centre. 2018. RAN WG1(Jan. 1, 2018). 148 Pages.

[No Author Listed], 3GPP TSG-RAN2 Meeting #107. R2-1911663. Aug. 26-30, 2019. 7 Pages.

Chinese Search Report dated Mar. 30, 2025, in connection with Chinese Application No. 202010790890.6, with English translation thereof.

Chinese Office Action dated Mar. 31, 2025, in connection with Chinese Application No. 202010790890.6, with English translation thereof.

[No Author Listed], Design of long-PUCCH over multiple slots. 3GPP TSG RAN WG1 Meeting #90bis. R1-1717494. Oct. 9, 2017. 4 pages.

[No Author Listed], Enhancements on multi-TRP/panel transmission. 3GPP TSG RAN WG1 #97. R1-1906224 May 13, 2019. 32 pages.

Korean Request for the Submission of an Opinion dated May 30, 2025, in connection with Korean Application No. 10-2023-7008092, with English translation thereof.

[No Author Listed], Medium Access Control (MAC) protocol specification (Release 16). 3GPP TS 38.321 v16.1.0. Jul. 2020. 149 pages.

[No Author Listed], 3GPP TSG RAN WG1 #101. R1-2003918. e-Meeting. May 25-Jun. 5, 2020. 12 Pages.

[No Author Listed], 3GPP TSG-RAN WG2 Meeting #111. R2-2007594. Electronic Meeting. Aug. 17-28, 2020. 901 pages.

* cited by examiner

CONFIGURATION METHOD, COMMUNICATION NODE, AND STORAGE MEDIUM

RELATED APPLICATIONS

This Application is a national stage filing under 35 U.S.C. 371 of International Patent Application Serial No. PCT/CN2021/111231, filed Aug. 6, 2021, entitled "CONFIGURATION METHOD, COMMUNICATION NODE, AND STORAGE MEDIUM" which claims priority to Chinese Application No. 202010790890.6, filed Aug. 7, 2020, the disclosures of which are hereby incorporated by reference in their entirety.

TECHNICAL FIELD

The present application relates to the field of communication technologies, for example, a configuration method, a communication node, and a storage medium.

BACKGROUND

For multiple transmission and reception points (multi-TRP) joint transmission technology, multiple transmission and reception points (TRPs) are used for transmission in an enhanced mobile broadband (eMBB) scenario, achieving an effective increase in transmission throughput of long-term evolution (LTE), long-term evolution-advanced (LTE-A), and new radio access technology (NR). Another technology of NR is multi-panel transmission, which uses multiple antenna panels for transmission to obtain higher spectral efficiency. Meanwhile, the transmission reliability of a communication system must also be ensured. Repeated transmissions or repeated reception of multi-TRP or multi-panel can increase the probability that a receiving end obtains correct information and effectively improve the transmission reliability in an ultra-reliable low-latency communications (URLLC) scenario.

However, how to configure a spatial relation in the transmission of the uplink control channel in multi-TRP or multi-panel is the current urgent technical problem.

SUMMARY

The present application provides a configuration method, a communication node, and a storage medium, effectively configuring the spatial relation in the transmission of the uplink control channel in multi-TRP or multi-panel.

In a first aspect, an embodiment of the present application provides a configuration method. The method includes: acquiring transmission indication information; and determining a spatial relation associated with an uplink control channel corresponding to the transmission indication information during repeated transmissions of the uplink control channel.

In a second aspect, an embodiment of the present application provides a configuration method. The method includes: determining transmission indication information, the transmission indication information indicating a spatial relation associated with an uplink control channel during repeated transmissions of the uplink control channel; and transmitting the transmission indication information.

In a third aspect, an embodiment of the present application provides a first communication node. The first communication node includes one or more processors. The one or more processors, when executed, implement the method according to the first aspect of the present application.

In a fourth aspect, an embodiment of the present application provides a second communication node. The second communication node includes one or more processors. The one or more processors, when executed, implement the method according to the second aspect of the present application.

In a fifth aspect, an embodiment of the present application provides a storage medium storing a computer program which, when executed by a processor, causes the processor to perform any method in embodiments of the present application.

DETAILED DESCRIPTION

Figure 1:
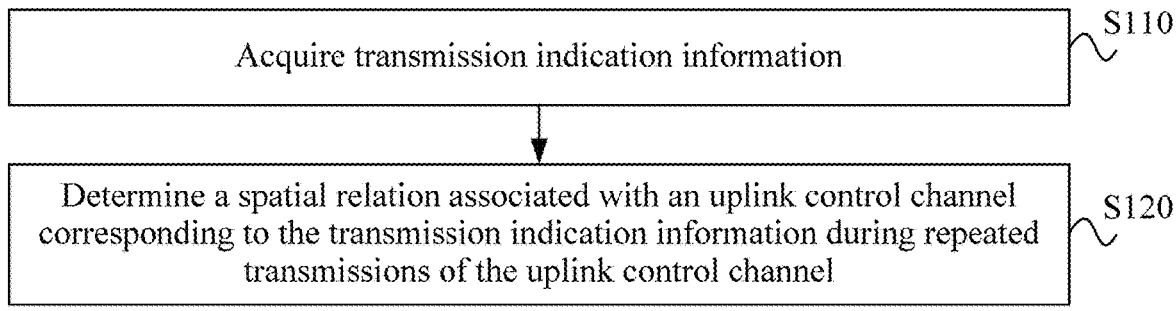
FIG. 1 is a flowchart of a configuration method according to an embodiment of the present application.

Embodiments of the present application are described hereinafter in detail in conjunction with the drawings.

The steps illustrated in the flowcharts among the drawings may be performed by, for example, a computer system capable of executing a set of computer-executable instructions. Moreover, although logical sequences are shown in the flowcharts, the shown or described steps may be performed in sequences different from those described herein in some cases.

The following briefly describes the concepts involved in the present application.

The transmission content in NR may be divided into data and signaling. Physical channels for transmitting signaling include a physical downlink control channel (PDCCH) and a physical uplink control channel (PUCCH). The PDCCH is mainly used for transmitting physical downlink control information (DCI), and the PUCCH is mainly used for transmitting uplink control information (UCI), such as channel state information (CSI), a hybrid automatic repeat request (HARQ), a scheduling request (SR), and the like. Physical channels for transmitting data include a physical downlink shared channel (PDSCH) and a physical uplink shared channel (PUSCH). The PDSCH is mainly used for transmitting downlink data, and the PUSCH is mainly used for transmitting uplink data and some uplink control information.

To obtain spatial diversity gain, transmission may be performed using multiple beams. Determination of which beam to use for transmission or reception depends on a beam indication in the beam management. In a case where a base station adopts analog beamforming for downlink transmission, the base station needs to indicate the sequence number of a downlink analog transmit beam selected by user equipment (UE). After the UE receives the indication, the best receive beam corresponding to the sequence number is called for downlink reception, based on information stored during beam training and pairing. In a case where a base station schedules UE to perform uplink transmission in analog beamforming, the base station needs to indicate assistance information of an uplink analog transmit beam to the UE. After the UE receives the assistance information, the UE performs uplink transmission according to the uplink analog transmit beam indicated by the base station, and the base station may call a receive beam corresponding to the transmit beam to perform uplink reception, based on information stored during beam training and pairing. For an uplink beam indication of a PUCCH, PUCCH radio resources are first configured, and different PUCCH resources are semi-statically configured with different transmit beam directions. A different transmit beam direction is selected by selecting a PUCCH radio resource so that beam switching in multiple directions is achieved.

To improve the reliability of data or signaling transmission, one manner is repetition transmission. M data (for example, the PDSCH or the PUSCH) is transmitted by repetition, which means that the M data carries exactly the same information. For example, the M data comes from the same transport block (TB) but corresponds to different redundancy versions (RVs) or independent RVs after corresponding channel coding, and the M data may even correspond to the same RV after channel coding. RVs refer to different redundancy versions after channel coding is performed on transmission data. Generally, a channel version may be taken from channel version {0, 1, 2, 3}. Similarly, M signaling (such as the PDCCH or the PUCCH) is transmitted by repetition, which means that the M signaling carries the same content. For example, M PDCCHs carry the same content of DCI (for example, each domain takes the same value). For example, M PUCCHs carry the same value of UCI. The M repeated data (such as M repeated PUSCHs or M repeated PDSCHs) or the M repetitions of signaling (such as M repeated PUCCHs or M repeated PDCCHs) may come from or be sent to M different TRPs or may come from M different antenna panels, M different bandwidth parts (BWPs) or M different carrier components (CCs). The M panels, the M BWPs, or the M CCs may belong to the same TRP or belong to multiple TRPs respectively. Schemes in which transmissions are repeated include, but are not limited to, at least one of the following: a space-division multiplexing scheme, that is Scheme 1, a frequency-division multiplexing scheme, that is Scheme 2, a time-division multiplexing scheme within a slot, that is Scheme 3, or a time-division multiplexing scheme between slots, that is Scheme 4. Schemes may also be any combination of the above multiplexing schemes, for example, a combination of space-division multiplexing and frequency-division multiplexing or a combination of time-division multiplexing and frequency-division multiplexing.

Embodiments of the present application, if not particularly described, generally include one terminal and at least two TRPs (or in the case of one TRP one UE includes at least one panel). In the present application, N PUCCH repetitions use time-division multiplexing for transmission.

In an exemplary embodiment, FIG. 1 is a flowchart of a configuration method according to an embodiment of the present application. This method may be applicable to the case of configuring a spatial relation in uplink channel transmission. This method may be performed by a configuration apparatus provided by the present application, and the configuration apparatus may be implemented by software and/or hardware and integrated into a first communication node. The first communication node includes, but is not limited to, user equipment.

As shown in FIG. 1, the configuration method provided by the present application includes the following.

In S110, transmission indication information is acquired.

The transmission indication information may be considered as information for an uplink control channel to transmit an indication. The transmission indication information may indicate a spatial relation associated with an uplink control channel, a frequency hopping configuration of the uplink control channel, and a repeated transmission configuration of the uplink control channel.

After the transmission indication information is acquired, the first communication node may determine, based on the transmission indication information, a spatial relation and a matching relationship that correspond to an uplink control channel when the uplink control channel performs repeated transmissions so as to transmit the uplink control channel based on the determined spatial relation.

The content included in the transmission indication information is not limited herein as long as one or more spatial relations associated with the uplink control channel during repeated transmissions can be indicated.

For example, two spatial relations associated with a PUCCH may be activated at the same time, so that one PUCCH resource can be associated with two beams, and thus the transmission indication information can indicate the associated spatial relations.

When a spatial relation is configured by the transmission indication information, the uplink control channel may be indicated to be associated with one or more spatial relations by activating the state of the one or more spatial relations or by an active group identification.

In S120, a spatial relation associated with an uplink control channel corresponding to the transmission indication information during repeated transmissions of the uplink control channel is determined.

After the transmission indication information is obtained, the spatial relation associated with the uplink control channel can be determined based on the transmission indication information. The means for determination is determined based on the content included in the transmission indication information and is not limited herein.

The present application may also determine the spatial relation that is associated with the uplink control channel and included in the transmission indication information and the repeated transmission configuration or the frequency hopping configuration that is included in the transmission indication information.

The present application provides a configuration method, and this method effectively configures, through the transmission indication information, the spatial relation during transmission of the uplink control channel.

Based on the preceding embodiments, variant embodiments of the preceding embodiments are provided. It is to be noted here that for ease of description, only differences from the preceding embodiments are described in the variant embodiments.

In one embodiment, the transmission indication information includes one or more of radio resource control (RRC) signaling, a media access control-control element, or downlink control information, and the uplink control channel includes a physical uplink control channel.

In one embodiment, determining the spatial relation associated with the uplink control channel corresponding to the transmission indication information during repeated transmissions of the uplink control channel, includes one or more of:
  determining one or more spatial relations associated with uplink transmission according to one or more states that are activated by a media access control-control element included in the transmission indication information and activated for a physical uplink control channel (PUCCH) resource and a PUCCH resource for the transmission of the uplink control channel indicated by downlink control information; or
  determining one or more spatial relations associated with uplink transmission according to group identification information activated by a media access control-control element included in the transmission indication information and a PUCCH resource for the transmission of the uplink control channel indicated by downlink control information.

The group identification information is identification information of a group formed by grouping higher-layer parameters indicating spatial relations. The grouping manner is not limited herein, and one or more spatial relations may be included within a group.

In the present example, the spatial relation associated with the uplink control channel during repeated transmissions of the uplink control channel may be determined based on the PUCCH resource for the transmission of the uplink control channel indicated by the downlink control information and the one or more states activated by the media access control-control element.

The one or more states activated by the media access control-control element may be considered as one or more active states of spatial relations.

In the present example, the one or more spatial relations associated with uplink transmission may be determined according to a PUCCH for the transmission of the uplink control channel indicated by the downlink control information and the group identification information activated by the media access control-control element. The active group identification information may be used to determine one or more active spatial relations.

In one embodiment, in a case where the uplink control channel is associated with at least two spatial relations during repeated transmissions of the uplink control channel and is configured with inter-slot frequency hopping or no frequency hopping, a matching manner for spatial relations when the uplink control channel performs repeated transmissions is determined according to an actual transmission occasion index.

The actual transmission occasion index may be an index of an actual transmission occasion during repeated transmissions, that is a relative index.

In one embodiment, a starting spatial relation of the uplink control channel in a group including even slots is the same as a starting spatial relation of the uplink control channel in a group including odd slots, and each intra-group spatial relation is matched in a sequential order or in a cyclical order according to an actual transmission occasion index.

In one embodiment, in a case where the number of the associated spatial relations is two, the starting spatial relation of the uplink control channel in the group including even slots is different from the starting spatial relation of the uplink control channel in the group including odd slots includes:
  the starting spatial relation of the uplink control channel in the group including even slots is a first spatial relation, and the starting spatial relation of the uplink control channel in the group including odd slots is a second spatial relation; or the starting spatial relation of the uplink control channel in the group including even slots is a second spatial relation, and the starting spatial relation of the uplink control channel in the group including odd slots is a first spatial relation.

The terms "first" and "second" in the first and second spatial relations are only used for distinguishing spatial relations.

A sequential matching manner means that a first spatial relation and a second spatial relation are used in different groups, such as 11221122 . . . , and a cyclical matching manner means that a first spatial relation and a second spatial relation are used cyclically between groups, such as 12121212 . . . "1" represents a first spatial relation, and "2" represents a second spatial relation.

In one embodiment, the starting spatial relation of the uplink control channel in the group including even slots is different from the starting spatial relation of the uplink control channel in the group including odd slots, and each intra-group spatial relation is matched in a sequential order or in a cyclical order according to an actual transmission occasion index.

In one embodiment, in a case where the number of the associated spatial relations is two, the starting spatial relation of the uplink control channel in the group including even slots is the same as the starting spatial relation of the uplink control channel in the group including odd slots includes:
  the starting spatial relation of the uplink control channel in the group including even slots and the starting spatial relation of the uplink control channel in the group including odd slots are a first spatial relation; or the starting spatial relation of the uplink control channel in the group including even slots and the starting spatial relation of the uplink control channel in the group including odd slots are a second spatial relation.

In one embodiment, the number of transmissions of different spatial relations is the same, and the number of transmissions is the sum of the number of transmissions of a spatial relation in a group including even slots and the number of transmissions of the same spatial relation in a group including odd slots.

In a case where the spatial relation is determined based on the actual transmission occasion index, the number of transmissions of different spatial relations among spatial relations included in odd slots and even slots for repeated transmissions is the same.

In one embodiment, in a case where the uplink control channel performs repeated transmissions N+M times (the number of transmissions in even slots is N and the number of transmissions in odd slots is M) and the number of associated spatial relations is two, the number of transmissions of the first spatial relation in the group including even slots is $\lfloor N/2 \rfloor$, the number of transmissions of the second spatial relation in the group including even slots is N−$\lfloor N/2 \rfloor$, the number of transmissions of the first spatial relation in the group including odd slots is M−$\lfloor M/2 \rfloor$, and the number of transmissions of the second spatial relation in the group including odd slots is $\lfloor M/2 \rfloor$. N and M are positive integers.

In one embodiment, in a case where the uplink control channel performs repeated transmissions N+M times (the number of transmissions in even slots is N and the number of transmissions in odd slots is M) and the number of associated spatial relations is two, the number of transmissions of the first spatial relation in the group including even slots is N−$\lfloor N/2 \rfloor$, the number of transmissions of the second spatial relation in the group including even slots is $\lfloor N/2 \rfloor$, the number of transmissions of the first spatial relation in the group including odd slots is $\lfloor M/2 \rfloor$, and the number of transmissions of the second spatial relation in the group including odd slots is M−$\lfloor M/2 \rfloor$. N and M are positive integers.

In one embodiment, in a case where the uplink control channel is associated with at least two spatial relations and is configured with inter-slot frequency hopping or no frequency hopping, a matching manner for spatial relations associated with the uplink control channel when the uplink control channel performs repeated transmissions is determined according to an absolute slot index.

The absolute slot index may be considered as an index determined by sequential ordering of subsequent slots based on an initial PUCCH transmission slot. To determine the matching manner for spatial relations, it may be determined based on the absolute slot index.

In one embodiment, an even slot and an odd slot correspond to different spatial relations associated with the uplink control channel, respectively.

In this embodiment, a spatial relation corresponding to an even slot and a spatial relation corresponding to an odd slot is different.

In one embodiment, in a case where the number of associated spatial relations is two, the even slot and the odd slot correspond to different spatial relations associated with the uplink control channel, respectively, includes:
   the even slot is associated with the first spatial relation, and the odd slot is associated with the second spatial relation; or
   the even slot is associated with the second spatial relation, and the odd slot is associated with the first spatial relation.

In one embodiment, determining the spatial relations associated with the uplink control channel according to the absolute slot index includes:
   grouping transmission slots starting from a starting transmission slot, each group including M slots, and M being greater than or equal to 2.

An even-numbered group corresponds to the first spatial relation, and an odd-numbered group corresponds to the second spatial relation; or
   an even-numbered group corresponds to the second spatial relation, and an odd-numbered group corresponds to the first spatial relation.

The starting transmission slot may be considered as the slot where repeated transmissions of a PUCCH are started. The transmission slots may be considered as all slots between the starting transmission slot and the last transmission slot.

After transmission slots are grouped, different numbers may be set for each group, and an odd-numbered group and an even-numbered group may correspond to different spatial relations. In one embodiment, the number of repetitions of the uplink control channel is semi-statically indicated by a higher-layer parameter, dynamically indicated by downlink control signaling, or dynamically indicated by a combination of a higher-layer parameter and downlink control signaling.

In one embodiment, in a case where the higher-layer parameter indicates that the number of repetitions is 1 and the sum of a starting symbol position S, a transmission interval K, and 2 times a duration L of the uplink control channel is less than or equal to a slot symbol length, the uplink control channel is transmitted repeatedly within a slot;
   in a case where the higher-layer parameter indicates that the number of repetitions is 1 and the sum of a starting symbol position S, a transmission interval K, and 2 times a duration L of the uplink control channel is greater than a slot symbol length, the uplink control channel is not transmitted repeatedly; or
   in a case where the higher-layer parameter indicates that the number of repetitions is greater than or equal to 2, the uplink control channel is transmitted repeatedly between slots.

The transmission interval is a symbol interval between two repeated transmissions of a PUCCH, the transmission interval is semi-statically indicated by a higher-layer parameter or dynamically indicated by downlink control signaling, and in a case where the transmission interval is not indicated, the value of the transmission interval is a set value. In the absence of the above indication, the transmission interval may take the default value K=0.

The number of repetitions of the uplink control channel may also be indicated jointly by the higher-layer parameter and the downlink control signaling.

In one embodiment, in a case where the higher-layer parameter indicates that the number of repetitions is 1 and the number of repetitions of the uplink control channel indicated by the downlink control signaling is 1, the uplink control channel is not transmitted repeatedly;
   in a case where the higher-layer parameter indicates that the number of repetitions is 1 and the number of repetitions of the uplink control channel indicated by the downlink control signaling is 2, the uplink control channel is transmitted repeatedly within a slot; or
   in a case where the higher-layer parameter indicates that the number of repetitions is not 1 or the number of repetitions of the uplink control channel indicated by the downlink control signaling is not 1 or 2, the uplink control channel is transmitted repeatedly between slots, and the number of repetitions of the uplink control channel is indicated by the higher-layer parameter or the downlink control signaling.

The number of repetitions of the uplink control channel may be indicated only by downlink control signaling.

In one embodiment, in a case where downlink control signaling indicates that the number of repetitions is 1 and the sum of a starting symbol position S, a transmission interval K, and 2 times a duration L of the uplink control channel is less than or equal to a slot symbol length, the uplink control channel is transmitted repeatedly within a slot;

in a case where downlink control signaling indicates that the number of repetitions is 1 and the sum of a starting symbol position S, a transmission interval K, and 2 times a duration L of the uplink control channel is greater than a slot symbol length, the uplink control channel is not transmitted repeatedly; or in a case where the value of downlink control signaling is greater than or equal to 2, the uplink control channel is transmitted repeatedly between slots.

The transmission interval is a symbol interval between two repeated transmissions of a PUCCH, and the transmission interval is semi-statically indicated by a higher-layer parameter or dynamically indicated by downlink control signaling. In the absence of the above indication, the transmission interval may take the default value K=0.

The number of repetitions of the uplink control channel may be semi-statically indicated by a higher-layer parameter, dynamically indicated by downlink control signaling, or dynamically indicated by a combination of a higher-layer parameter and downlink control signaling.

In one embodiment, in a case where the uplink control channel is configured with intra-slot frequency hopping and configured to be transmitted repeatedly within a slot, frequency hopping is performed within the uplink control channel.

Frequency hopping within the uplink control channel can mean that one transmission of an uplink control channel corresponds to two frequency hopping units, each frequency hopping unit corresponding to a different symbol, and each frequency hopping unit corresponding to a different frequency domain resource.

In one embodiment, in a case where the uplink control channel is configured with intra-slot frequency hopping and configured to be transmitted repeatedly within a slot, frequency hopping is performed between uplink control channels.

Frequency hopping between uplink control channels can mean that one transmission of an uplink control channel corresponds to one frequency hopping unit, each frequency hopping unit corresponding to a different frequency domain resource.

In one embodiment, in a case where the uplink control channel is configured with intra-slot frequency hopping and configured to be transmitted repeatedly between slots, a unit of spatial relation matching is a frequency hopping unit or a slot.

In a case where the uplink control channel is configured with intra-slot frequency hopping and configured to be transmitted repeatedly between slots, a different frequency hopping unit may be associated with a different spatial relation, or a different slot may be associated with a different spatial relation.

Figure 2:
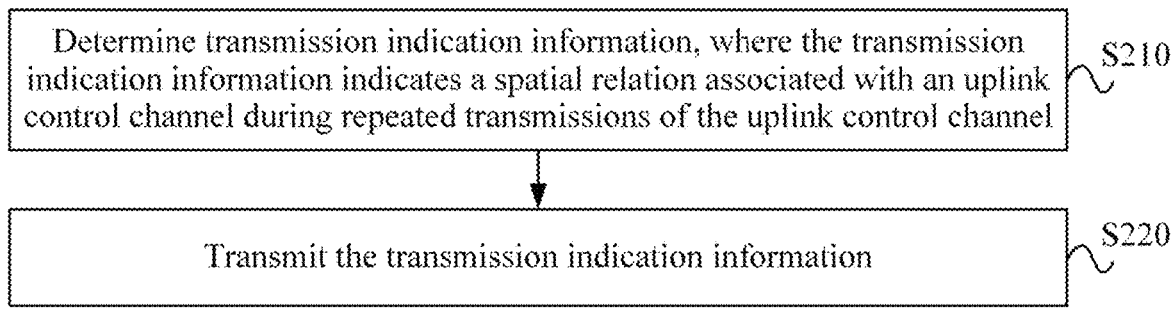
FIG. 2 is a flowchart of another configuration method according to an embodiment of the present application.

In an exemplary embodiment, the present application further provides a configuration method, and FIG. 2 is a flowchart of another configuration method according to an embodiment of the present application. The method may be applied to a case of configuring a spatial relation associated with an uplink control channel during repeated transmissions of the uplink control channel. The configuration method may be performed by a configuration apparatus, and the configuration apparatus may be implemented by software and/or hardware and generally integrated into a second communication node. The second communication node may be a base station. For the content that is not yet exhaustive in this embodiment, reference may be made to the preceding embodiments.

As shown in FIG. 2, the configuration method provided in this example includes the following.

In S210, transmission indication information is determined, and the transmission indication information indicates a spatial relation associated with an uplink control channel during repeated transmissions of the uplink control channel.

The second communication node may determine the specific content of the transmission indication information according to the spatial relation required to be associated with the transmitted uplink control channel, and the specific content of the transmission indication information is not limited here. The transmission indication information may indicate one or more spatial relations associated with the uplink control channel during repeated transmissions of the uplink control channel. The indication means may be activation by a state or activation by group identification information.

In S220, the transmission indication information is transmitted.

After the transmission indication information is determined, the determined transmission indication information may be transmitted to a corresponding first communication node.

According to the configuration method provided by the present application, the spatial relation associated with the uplink control channel when the first communication node transmits the uplink control channel can be effectively configured by the determined transmission indication information.

Based on the preceding embodiments, variant embodiments of the preceding embodiments are provided. It is to be noted here that for ease of description, only differences from the preceding embodiments are described in the variant embodiments.

In one embodiment, the transmission indication information includes one or more of radio resource control (RRC) signaling, a media access control-control element, or downlink control information, and the uplink control channel includes a physical uplink control channel.

In one embodiment, one or more states are activated by the media access control-control element included in the transmission indication information and activated for a physical uplink control channel (PUCCH) resource, and a PUCCH resource is for the transmission of the uplink control channel indicated by the downlink control information; or group identification information is activated by the media access control-control element included in the transmission indication information, and a PUCCH resource is for the transmission of the uplink control channel indicated by the downlink control information. The group identification information is identification information of a group formed by grouping higher-layer parameters indicating spatial relations, and one or more spatial relations are included within the group.

In one embodiment, in a case where the uplink control channel is associated with at least two spatial relations and is configured with inter-slot frequency hopping or no frequency hopping, a matching manner for spatial relations when the uplink control channel performs repeated transmissions is determined according to an actual transmission occasion index.

In one embodiment, a starting spatial relation of the uplink control channel in a group including even slots is the same as a starting spatial relation of the uplink control channel in a group including odd slots, and each intra-group spatial relation is matched in a sequential order or in a cyclical order according to an actual transmission occasion index; or
 a starting spatial relation of the uplink control channel in a group including even slots is different from a starting spatial relation of the uplink control channel in a group including odd slots, and each intra-group spatial relation is matched in a sequential order or in a cyclical order according to an actual transmission occasion index.

In one embodiment, in a case where the number of the associated spatial relations is two, the starting spatial relation of the uplink control channel in the group including even slots is the same as the starting spatial relation of the uplink control channel in the group including odd slots includes:
 the starting spatial relation of the uplink control channel in the group including even slots and the starting spatial relation of the uplink control channel in the group including odd slots are a first spatial relation; or the starting spatial relation of the uplink control channel in the group including even slots and the starting spatial relation of the uplink control channel in the group including odd slots are a second spatial relation.

In one embodiment, in a case where the number of the associated spatial relations is two, the starting spatial relation of the uplink control channel in the group including even slots is different from the starting spatial relation of the uplink control channel in the group including odd slots includes:
 the starting spatial relation of the uplink control channel in the group including even slots is a first spatial relation, and the starting spatial relation of the uplink control channel in the group including odd slots is a second spatial relation; or the starting spatial relation of the uplink control channel in the group including even slots is a second spatial relation, and the starting spatial relation of the uplink control channel in the group including odd slots is a first spatial relation.

In one embodiment, the number of transmissions of different spatial relations is the same, and the number of transmissions is the sum of the number of transmissions of a spatial relation in the group including even slots and the number of transmissions of the same spatial relation in the group including odd slots.

In one embodiment, in a case where the uplink control channel performs repeated transmissions N+M times and the number of the associated spatial relations is two, the number of transmissions of the first spatial relation in the group including even slots is $\lfloor N/2 \rfloor$, the number of transmissions of the second spatial relation in the group including even slots is $N-\lfloor N/2 \rfloor$, the number of transmissions of the first spatial relation in the group including odd slots is $M-\lfloor M/2 \rfloor$, and the number of transmissions of the second spatial relation in the group including odd slots is $\lfloor M/2 \rfloor$. The number of transmissions in even slots is N, and the number of transmissions in odd slots is M. N and M are positive integers.

In one embodiment, in a case where the uplink control channel performs repeated transmissions N+M times and the number of the associated spatial relations is two, the number of transmissions of the first spatial relation in the group including even slots is $N-\lfloor N/2 \rfloor$, the number of transmissions of the second spatial relation in the group including even slots is $\lfloor N/2 \rfloor$, the number of transmissions of the first spatial relation in the group including odd slots is $\lfloor M/2 \rfloor$, and the number of transmissions of the second spatial relation in the group including odd slots is $M-\lfloor M/2 \rfloor$. The number of transmissions in even slots is N, and the number of transmissions in odd slots is M. N and M are positive integers.

In one embodiment, in a case where the uplink control channel is associated with at least two spatial relations and is configured with inter-slot frequency hopping or no frequency hopping, the spatial relations associated with the uplink control channel and a matching manner for a matching relationship of repeated transmissions are determined according to an absolute slot index.

In one embodiment, an even slot and an odd slot correspond to different spatial relations associated with the uplink control channel, respectively.

In one embodiment, in a case where the number of the associated spatial relations is two, the even slot and the odd slot correspond to different spatial relations associated with the uplink control channel, respectively, includes:
 the even slot is associated with the first spatial relation, and the odd slot is associated with the second spatial relation; or
 the even slot is associated with the second spatial relation, and the odd slot is associated with the first spatial relation.

In one embodiment, determining the spatial relations associated with the uplink control channel according to the absolute slot index includes:
 grouping transmission slots starting from a starting transmission slot, each group including M slots, and M being greater than or equal to 2.

An even-numbered group corresponds to the first spatial relation, and an odd-numbered group corresponds to the second spatial relation; or
 an even-numbered group corresponds to the second spatial relation, and an odd-numbered group corresponds to the first spatial relation.

In one embodiment, the method further includes: semi-statically indicating the number of repetitions of the uplink control channel using a higher-layer parameter.

In one embodiment, the semi-statically indicating the number of repetitions of the uplink control channel using the higher-layer parameter includes one of:
 in a case where the uplink control channel is transmitted repeatedly within a slot, the higher-layer parameter indicates that the number of repetitions is 1, and the sum of a starting symbol position, a transmission interval, and 2 times a duration of the uplink control channel is less than or equal to a slot symbol length;
 in a case where the uplink control channel is not transmitted repeatedly, the higher-layer parameter indicates that the number of repetitions is 1, and the sum of a starting symbol position, a transmission interval, and 2 times a duration of the uplink control channel is greater than a slot symbol length; or
 in a case where the uplink control channel is transmitted repeatedly between slots, the higher-layer parameter indicates that the number of repetitions is greater than or equal to 2.

The transmission interval is a symbol interval between two repeated transmissions of a PUCCH, and the transmission interval is semi-statically indicated by a higher-layer parameter or dynamically indicated by downlink control signaling. In a case where the transmission interval is not indicated, the value of the transmission interval is a set value.

In one embodiment, the method further includes: dynamically indicating the number of repetitions of the uplink control channel using a higher-layer parameter and downlink control signaling.

In one embodiment, the dynamically indicating the number of repetitions of the uplink control channel using the higher-layer parameter and the downlink control signaling includes:

in a case where the uplink control channel is not transmitted repeatedly, the higher-layer parameter indicates that the number of repetitions is 1 and the number of repetitions of the uplink control channel indicated by the downlink control signaling is 1;

in a case where the uplink control channel is transmitted repeatedly within a slot, the higher-layer parameter indicates that the number of repetitions is 1, and in a case where the number of repetitions of the uplink control channel indicated by the downlink control signaling is 2, the uplink control channel is transmitted repeatedly within a slot; or in a case where the uplink control channel is transmitted repeatedly between slots, the higher-layer parameter indicates that the number of repetitions is not 1 or the number of repetitions of the uplink control channel indicated by the downlink control signaling is not 1 or 2.

In one embodiment, the method further includes: dynamically indicating the number of repetitions of the uplink control channel using downlink control signaling.

In one embodiment, the dynamically indicating the number of repetitions of the uplink control channel using the downlink control signaling includes:

in a case where the uplink control channel is transmitted repeatedly within a slot, the downlink control signaling indicates that the number of repetitions is 1, and the sum of a starting symbol position, a transmission interval, and 2 times a duration of the uplink control channel is less than or equal to a slot symbol length;

in a case where the uplink control channel is not transmitted repeatedly, the downlink control signaling indicates that the number of repetitions is 1, and the sum of a starting symbol position, a transmission interval, and 2 times a duration of the uplink control channel is greater than a slot symbol length; or in a case where the uplink control channel is transmitted repeatedly between slots, the value of the downlink control signaling is greater than or equal to 2.

The transmission interval is a symbol interval between two repeated transmissions of a PUCCH, and the transmission interval is semi-statically indicated by a higher-layer parameter or dynamically indicated by downlink control signaling. In a case where the transmission interval is not indicated, the value of the transmission interval is a set value.

In one embodiment, in a case where the uplink control channel is configured with intra-slot frequency hopping and configured to be transmitted repeatedly within a slot, frequency hopping is performed within the uplink control channel; or in a case where the uplink control channel is configured with intra-slot frequency hopping and configured to be transmitted repeatedly within a slot, frequency hopping is performed between uplink control channels.

In one embodiment, in a case where the uplink control channel is configured with intra-slot frequency hopping and configured to be transmitted repeatedly between slots, a unit of spatial relation matching is a frequency hopping unit or a slot.

An exemplary description of the present application is made below. The configuration method provided by the present application can be considered as a method for enhancing uplink channel transmission, and the present application enhances the transmission reliability of uplink information in multi-TRP or multi-panel. The present application provides a method in which a PUCCH indicated by DCI performs multi-beam transmission. In a case where a PUCCH is transmitted repeatedly between slots and is configured with inter-slot frequency hopping and an indicated PUCCH resource is associated with two spatial relations, a method for matching a beam is provided. A method of indicating that a PUCCH is transmitted repeatedly within a slot is provided. In a case where a PUCCH is configured with intra-slot frequency hopping, a frequency hopping method when a PUCCH is transmitted repeatedly within a slot is provided.

Example 1: this example illustrates a method in which a PUCCH indicated by DCI performs multi-beam transmission, and the specific content is as follows.

Figure 2A:
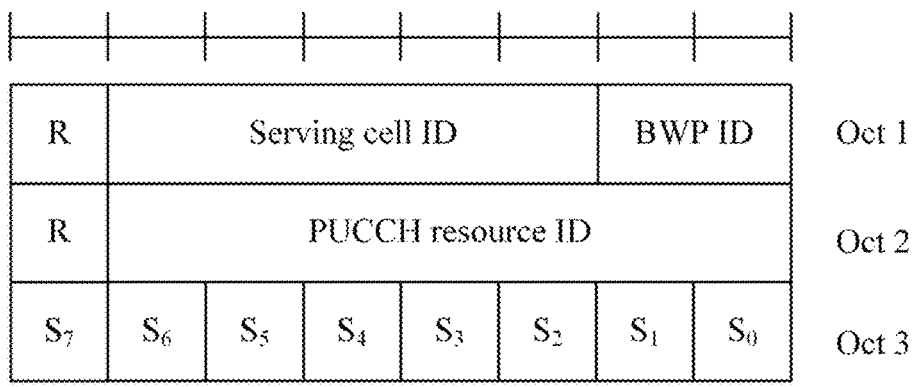
FIG. 2A is a diagram of a bitmap according to an embodiment of the present application.

In R15, on each BWP, a PUCCH may be configured with at most eight higher-layer parameters such as PUCCH-SpatialRelationInfo, and such parameters include a beam-related parameter such as referenceSignal and power control-related parameters such as pucch-PathlossReferenceRS-Id, p0-PUCCH-Id, and closedLoopIndex. Media access control-control element (MAC-CE) signaling is used for indication, the MAC-CE signaling includes a bitmap of PUCCH-SpatialRelationInfo, and FIG. 2a is a diagram of a bitmap according to an embodiment of the present application. The length of the bitmap is 8 bits. Si represents an active state of PUCCH spatial-relation information corresponding to PUCCH-SpatialRelationInfoId i. In a case where Si is set to 1, it represents that PUCCH spatial information (PUCCH spatial-relation) corresponding to PUCCH-SpatialRelationInfoId i is activated, and UE may transmit a PUCCH using a corresponding beam. In a case where Si is set to 0, it represents that PUCCH spatial-relation information corresponding to PUCCH-SpatialRelationInfoId i should be deactivated. PUCCH spatial-relation information of a PUCCH resource can only be activated for one PUCCH resource at a time.

To realize PUCCH repetition transmission using the multi-beam transmission manner, the following two methods are considered, and in the present application beams are in one-to-one correspondence with spatial relations.

Method 1: two PUCCH spatial relations may be allowed to be activated at the same time, so that one PUCCH resource can be associated with two beams.

Method 2: eight PUCCH higher-layer parameters PUCCH-SpatialRelationInfo that are configured on an active BWP are used. The eight PUCCH-SpatialRelationInfo are paired to generate n new groups of PUCCH-SpatialRelationInfo groups. Table 1 is a table of a grouping manner for grouping spatial relations according to an embodiment of the present application. The grouping results may be found in Table 1, but this manner is without limitation.

TABLE 1

A table of a grouping manner for grouping spatial relations
according to an embodiment of the present application

| MAC-CE active state | PUCCH-SpatialRelationInfo group index | active state of PUCCH spatial relation information | active state of PUCCH spatial relation information |
|---|---|---|---|
| S10 | 0 | S0 | S1 |
| S11 | 1 | S1 | S2 |
| S12 | 2 | S2 | S3 |
| S13 | 3 | S3 | S4 |
| S14 | 4 | S4 | S5 |
| S15 | 5 | S5 | S6 |
| S16 | 6 | S6 | S7 |
| S17 | 7 | S7 | S7 |

Taking the grouping manner in Table 1 as an example, when a MAC-CE activates S11 for UE, a transmit beam of the UE is determined by S1 and S2 of the initially configured PUCCH-SpatialRelationInfo.

When a base station associates, through DCI, a PUCCH resource indicated by the UE with two spatial relations, the UE may use two beams for uplink transmission.

Example 2: this example illustrates a method of matching a beam according to a relative index in a case where a PUCCH is transmitted repeatedly between slots and configured with inter-slot frequency hopping and an indicated PUCCH resource is associated with two spatial relations.

Figure 2B:
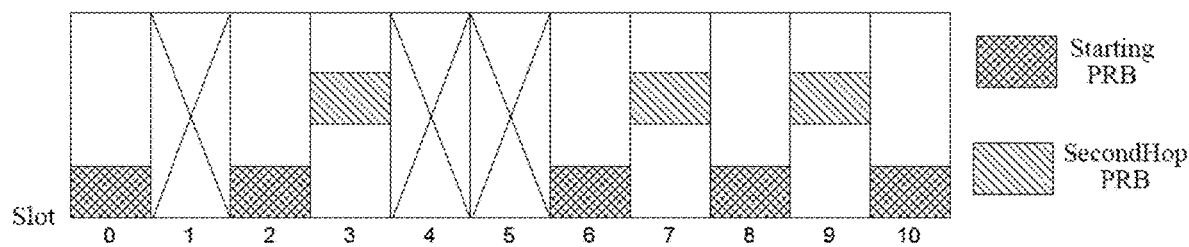
FIG. 2B is a diagram of the configuration of inter-slot frequency hopping according to an embodiment of the present application.

To further improve the coverage of a PUCCH, NR supports repeated transmissions of the PUCCH, i.e., multi-slot PUCCH aggregation, and the number of transmission repetitions $N_{PUCCH}^{repeat}$ may be configured using higher-layer signaling. In a multi-slot PUCCH, PUCCH frequency hopping between slots is additionally introduced to obtain frequency diversity gain. FIG. 2b is a diagram of the configuration of inter-slot frequency hopping according to an embodiment of the present application. Referring to FIG. 2b, if inter-slot frequency hopping is configured, the configuration (indicated by a startingPRB) of a physical resource block (PRB) index of a first frequency hopping unit is applied to the index of an even slot in the multi-slot PUCCH, and the configuration (indicated by a secondHopPRB) of a PRB index of a second frequency hopping unit is applied to the index of an odd slot in the multi-slot PUCCH.

When a PUCCH resource indicated by the base station is associated with multiple beams and inter-slot frequency hopping is configured, a method of allocating PUCCH beams according to an actual transmission occasion index is provided.

Figure 2C:
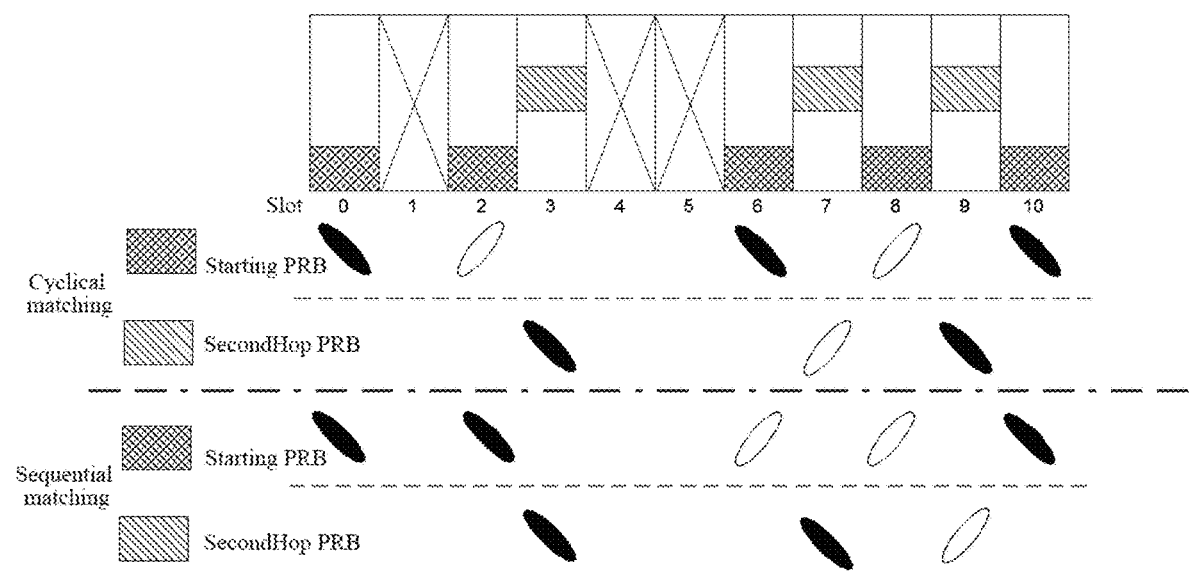
FIG. 2C is a diagram of a configuration of a spatial relation according to an embodiment of the present application.

Method 1: FIG. 2c is a diagram of a configuration of a spatial relation according to an embodiment of the present application. Referring to FIG. 2c, all slots satisfying a PUCCH transmission condition are grouped, an even slot is a frequency domain resource indicated by a startingPRB corresponding to group 0, an odd slot is a frequency domain resource indicated by a secondHopPRB corresponding to group 1, and the same starting beam is used for cycles of group 0 and group 1 separately. For example, when an indicated PUCCH resource is associated with spatial relation 0 and spatial relation 1, spatial relation 0 and spatial relation 1 correspond to beam 0 and beam 1, respectively. Sequential or cyclic matching of beams is performed within group 0 and group 1.

In FIG. 2c, slot 0, 2, 6, 8, 10 form group 0, and slot 3, 7, 9 form group 1. The upper part of FIG. 2c is beam cycle matching, and the beam cycle manner in group 0 and group 1 is: beam 0, beam 1, beam 0, beam 1 . . . ; the lower part of FIG. 2c is beam sequential matching, and the beam cycle manner in group 0 and group 1 is: beam 0, beam 0, beam 1, beam 1 . . . .

Figure 2D:
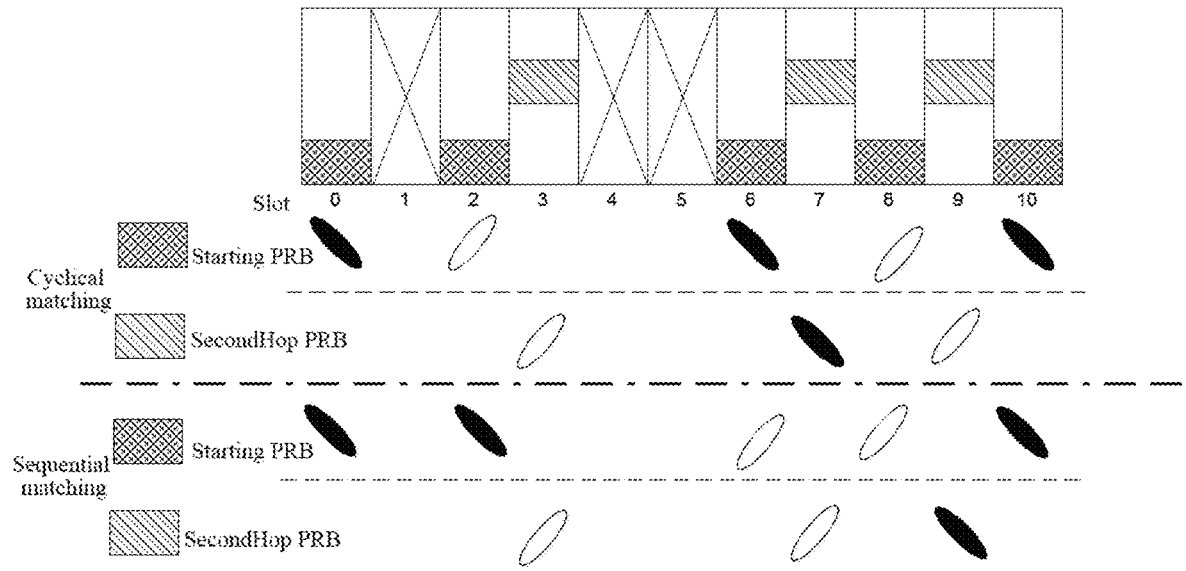
FIG. 2D is a diagram of another configuration of a spatial relation according to an embodiment of the present application.

Method 2: FIG. 2d is a diagram of another configuration of a spatial relation according to an embodiment of the present application. Referring to FIG. 2d, all slots satisfying a PUCCH transmission condition are grouped, an even slot is a frequency domain resource indicated by a startingPRB corresponding to group 0, an odd slot is a frequency domain resource indicated by a secondHopPRB corresponding to group 1, and different starting beams in group 0 and group 1 are used for cycles separately. For example, when an indicated PUCCH resource is associated with spatial relation 0 and spatial relation 1, spatial relation 0 and spatial relation 1 correspond to beam 0 and beam 1, respectively.

In FIG. 2d, slot 0, 2, 6, 8, 10 form group 0, and slot 3, 7, 9 form group 1. The upper part of FIG. 2d is beam cycle matching, the cycle manner of beams corresponding to group 0 is beam 0, beam 1, beam 0, and beam 1 . . . , and the cycle manner of beams corresponding to group 1 is beam 1, beam 0, beam 1, and beam 0 . . . . The lower part of FIG. 2d is beam sequential matching, the cycle manner of beams corresponding to group 0 is beam 0, beam 0, beam 1, and beam 1 . . . , and the cycle manner of beams corresponding to group 1 is beam 1, beam 1, beam 0, and beam 0 . . . .

Method 3: on the basis of grouping in method 1 or method 2, the number of different beams in group 0 and group 1 is limited: N transmissions corresponding to group 0 are divided into two parts, the number of transmissions corresponding to beam 0 is $\lfloor N/2 \rfloor$, and the number of transmissions corresponding to beam 1 is $N-\lfloor N/2 \rfloor$; M transmissions corresponding to group 1 are divided into two parts, the number of transmissions corresponding to beam 0 is $M-\lfloor M/2 \rfloor$, and the number of transmissions corresponding to beam 1 is $\lfloor M/2 \rfloor$.

Figure 2E:
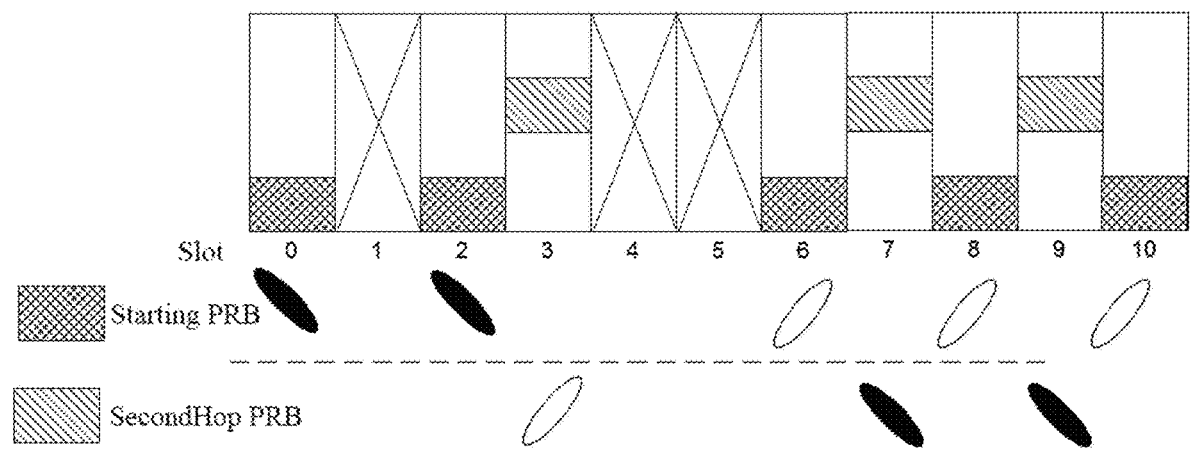
FIG. 2E is a diagram of another configuration of a spatial relation according to an embodiment of the present application.

FIG. 2e is a diagram of another configuration of a spatial relation according to an embodiment of the present application. Referring to FIG. 2e, slot 0, 2, 6, 8, 10 form group 0, and slot 3, 7, 9 form group 1. According to the above method, the following is calculated: in group 0, 2 transmissions use beam 0, and 3 transmissions use beam 1; and in group 1, 2 transmissions use beam 0, and 1 transmission uses beam 1. The beam matching manner in FIG. 2e adopts a group matching manner, that is, beam 0 is used for the first $\lfloor N/2 \rfloor$ transmissions corresponding to group 0, and beam 1 is used for the remaining $N-\lfloor N/2 \rfloor$ transmissions corresponding to group 0; beam 1 is used for the first $\lfloor M/2 \rfloor$ transmissions corresponding to group 1, and beam 0 is used for the remaining $M-\lfloor M/2 \rfloor$ transmissions corresponding to group 1. The matching manner is not limited to the above way, and cyclic matching or sequential matching in method 2 may also be used.

Example 3: this example is used to illustrate a method of matching a beam according to an absolute index in a case where a PUCCH is transmitted repeatedly between slots and configured with inter-slot frequency hopping and an indicated PUCCH resource is associated with two spatial relations.

In R15, the introduced inter-slot PUCCH frequency hopping is indicated according to the absolute index. The advantage of this is to ensure that multiple UEs served by the same base station do not collide in the frequency domain, and therefore beam assignment based on the absolute index should also be considered, thereby avoiding the beam collision problem of different UEs.

This example is used to illustrate a method of allocating PUCCH beams according to the absolute slot index in a case where a PUCCH resource indicated by the base station is associated with multiple beams and inter-slot frequency hopping is configured.

Figure 2F:
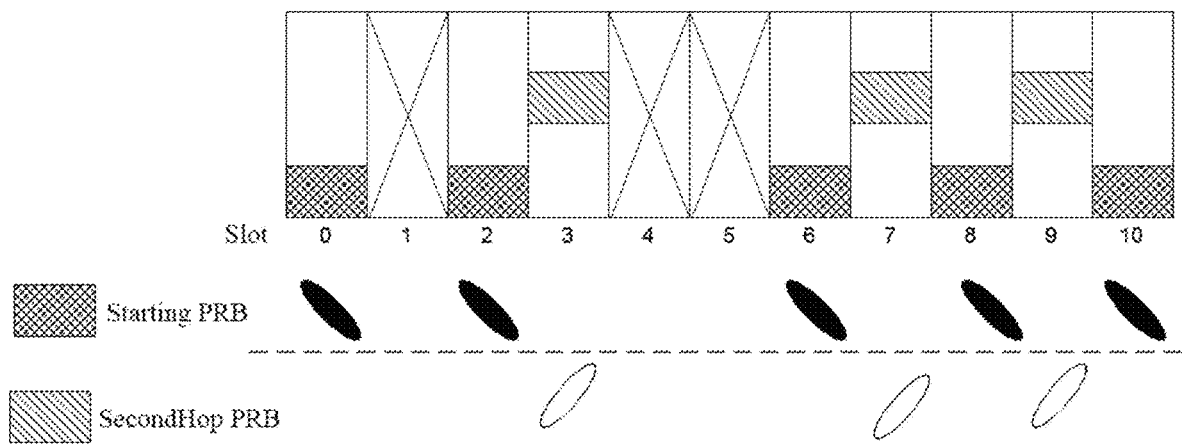
FIG. 2F is a diagram of another configuration of a spatial relation according to an embodiment of the present application.

Method 1: FIG. 2f is a diagram of another configuration of a spatial relation according to an embodiment of the present application. Referring to FIG. 2f, a beam is associated with a frequency hopping indication, and even slots and odd slots correspond to multiple beams associated with PUCCH resources, respectively. For example, when an indicated PUCCH resource is associated with spatial relation 0 and spatial relation 1, spatial relation 0 and spatial relation 1 correspond to beam 0 and beam 1, respectively. Beam 0 is applied to a slot indicated by startingPRB, and beam 1 is applied to a slot indicated by secondHopPRB.

In FIG. 2f, slots for transmitting a PUCCH in even slots include slot 0, 2, 6, 8, and 10, which use a corresponding beam 0, and slots for transmitting a PUCCH in odd slots include slot 3, 7, and 9, which use a corresponding beam 1.

Figure 2G:
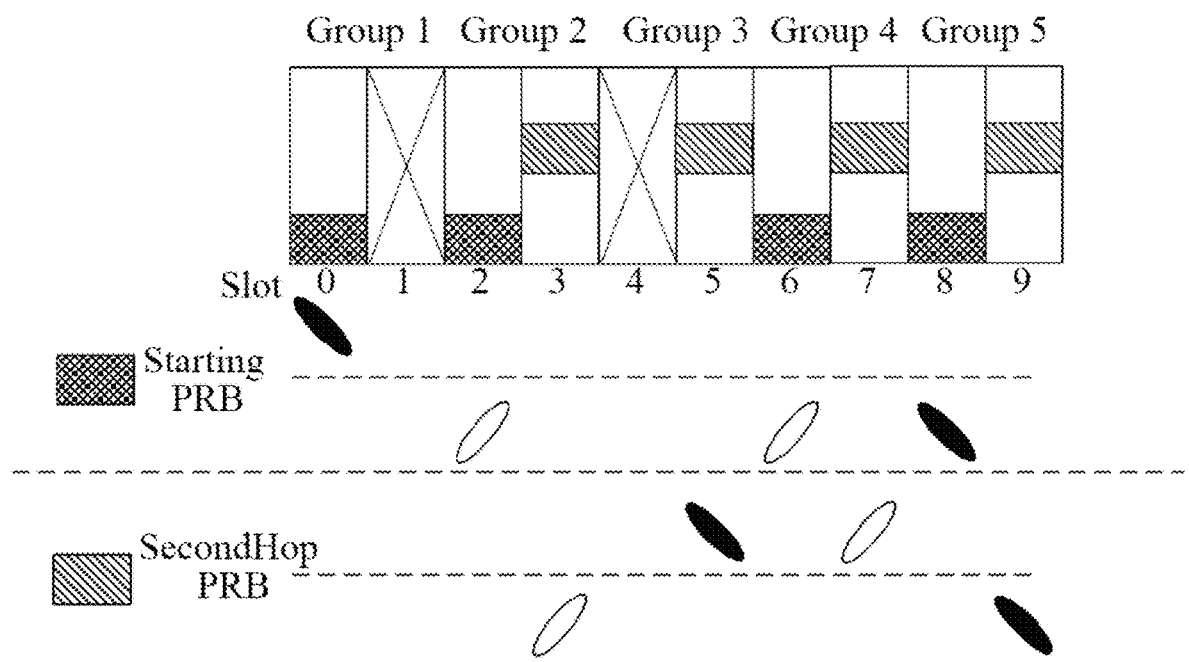
FIG. 2G is a diagram of another configuration of a spatial relation according to an embodiment of the present application.

Method 2: FIG. 2g is a diagram of another configuration of a spatial relation according to an embodiment of the present application, and referring to FIG. 2g, subsequent slots are grouped starting from a starting transmission slot. Each group includes M slots (M is greater than or equal to 2), an even-numbered group uses beam 0 for transmission, and an odd-numbered group uses beam 1 for transmission.

Taking M=2 as an example:
the first group is slot 0 and 1, and beam 0 is used for transmission;
the second group is slot 2 and 3, and beam 1 is used for transmission;
the third group is slot 4 and 5, and beam 0 is used for transmission; and
the fourth group is slot 6 and 7, and beam 1 is used for transmission . . . .

For example, as shown in FIG. 2g, the number of repetitions is 8.

Example 4: this example illustrates a method of indicating that a PUCCH is transmitted repeatedly within a slot.

To achieve repeated transmissions of a PUCCH within a slot, one transmission interval K, that is, a symbol interval between two transmissions, needs to be indicated through higher layers. In a case where this parameter is not configured, K=0 by default. PUCCH resources indicated for UE by a base station via a PUCCH resource indicator (PRI) in DCI include a starting symbol position S and a duration L of the PUCCH.

The UE may determine whether repeated transmissions between slots or within a slot are employed according to the above information and the indicated number of repetitions. The determination method is as follows.

Method 1: the number of repetitions of a PUCCH is semi-statically indicated only by a higher-layer parameter nrofslots.

1. In a case where nrofslots=1.

The UE determines the relationship between the starting symbol position S, the duration L, and the transmission interval K of the PUCCH indicated by the PRI. The value range of S is 0-13.

Figure 2H:
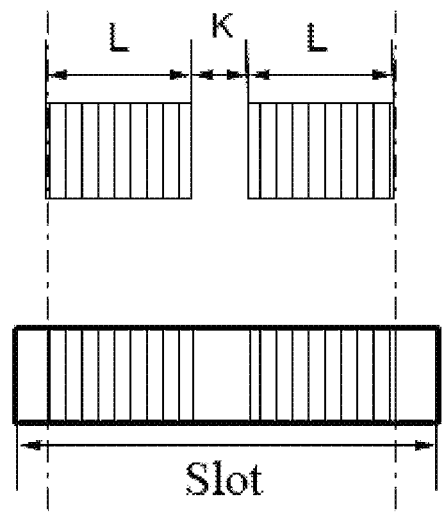
FIG. 2H is a diagram of the determination of a PUCCH transmission manner according to an embodiment of the present application.
Figure 2I:
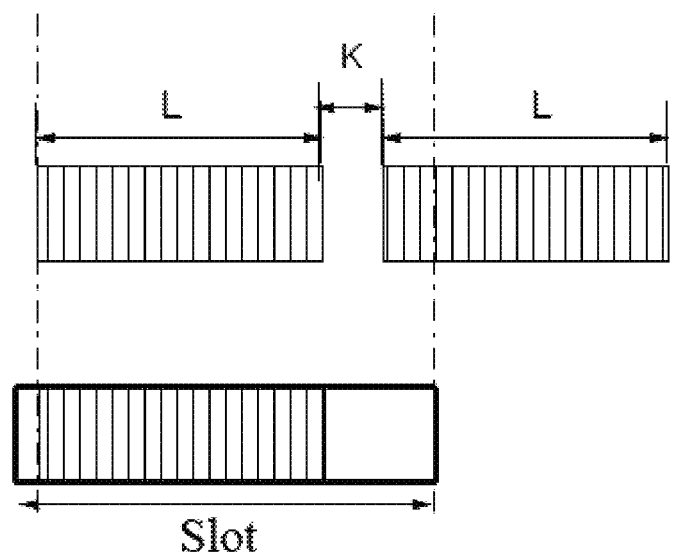
FIG. 2I is a diagram of another determination of a PUCCH transmission manner according to an embodiment of the present application.

FIG. 2h is a diagram of the determination of a PUCCH transmission manner according to an embodiment of the present application, and FIG. 2i is a diagram of another determination of a PUCCH transmission manner according to an embodiment of the present application. As shown in FIG. 2h, when S+L+K+L is less than or equal to 13, UE performs repeated transmissions within a slot.

As shown in FIG. 2i, when S+L+K+L is greater than 13, the UE does not perform repeated transmissions.

2. In a Case where Nrofslots is Greater than or Equal to 2.

The UE performs repeated transmissions within a slot according to the starting symbol position S and the duration L of the PUCCH indicated by the PRI.

Method 2: Semi-Static Indication.

The number of repetitions of the PUCCH is indicated jointly by a higher-layer parameter nrofslots and DCI. In R16, the number of transmission repetitions of a PUCCH is semi-statically indicated by a higher-layer parameter, and however, when a channel state changes rapidly, the indicated number of repetitions may not conform to the current channel condition. Therefore, the present application introduces a method of dynamically indicating the number of repetitions of a PUCCH by DCI.

1. A semi-static parameter nrofslot=1, and dynamic DCI indicates that the number of repeated transmissions is 2.

The UE perform repeated transmissions within a slot, the same as the case where S+L+K+L is less than or equal to 13 in method 1.

2. The semi-static parameter nrofslot=1, and dynamic DCI indicates that the number of repeated transmissions is 1.

The UE does not perform repeated transmissions.

3. Indication cases other than 1 and 2

The UE performs repeated transmissions between slots according to the starting symbol position S and the duration L of the PUCCH indicated by the PRI.

Example 5: this example is used to illustrate the problem of repeated transmissions within a slot in a case where a PUCCH is configured with intra-slot frequency hopping.

All PUCCH formats in LTE must support frequency hopping to obtain frequency diversity gain. However, in NR, considering the flexibility of system design, all frequency hopping of PUCCH formats greater than or equal to 2 symbols is configurable. For a PUCCH that has a length of N orthogonal frequency division multiplex (OFDM) symbols, if intra-slot frequency hopping is configured, the number of OFDM symbols of a first frequency hopping unit is $\lfloor N/2 \rfloor$, the configuration of a PRB index is indicated by startingPRB, the number of OFDM symbols of a second frequency hopping unit is $N-\lfloor N/2 \rfloor$, and the configuration of a PRB index is indicated by secondPRB.

Figure 2J:
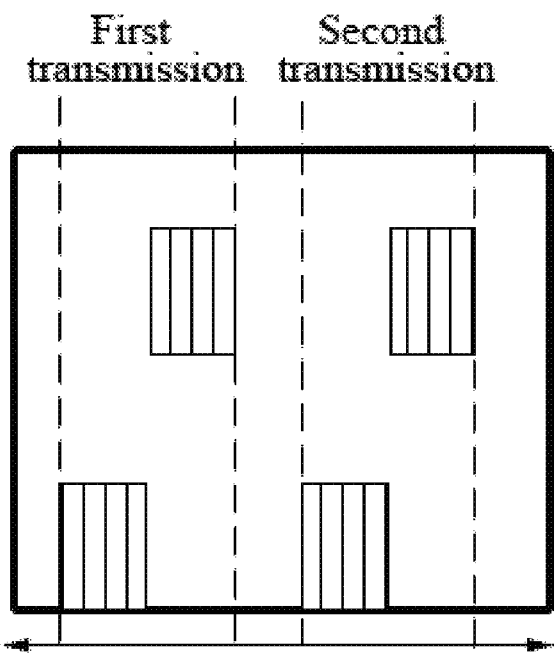
FIG. 2J is a diagram of a PUCCH transmission manner according to an embodiment of the present application.
Figure 2K:
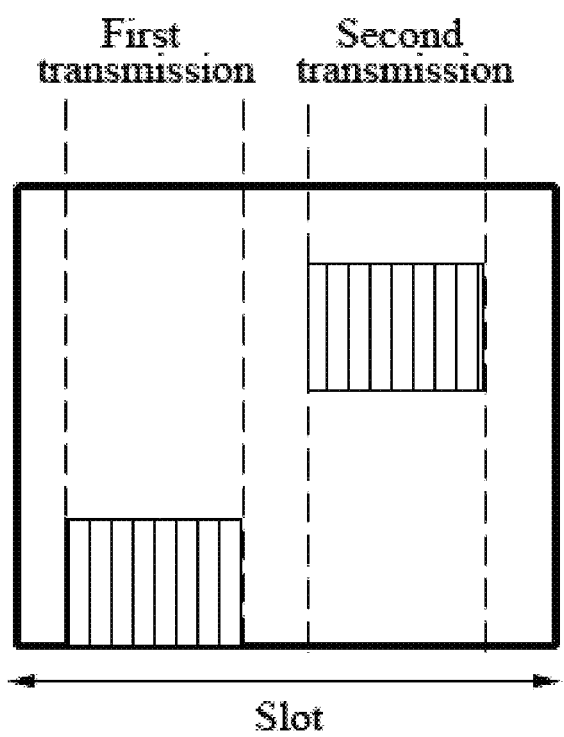
FIG. 2K is a diagram of another PUCCH transmission manner according to an embodiment of the present application.

FIG. 2j is a diagram of a PUCCH transmission manner according to an embodiment of the present application, and FIG. 2k is a diagram of another PUCCH transmission manner according to an embodiment of the present application. When UE is indicated to perform repeated transmissions of a PUCCH within a slot, the following two methods are considered as intra-slot frequency hopping methods.

Method 1: for a PUCCH that has a length of N OFDM symbols, two transmissions are repeated within a slot, and each transmission corresponds to two frequency hopping units. As shown in FIG. 2j, the number of OFDM symbols of a first frequency hopping unit is $\lfloor N/2 \rfloor$, and the configuration of a PRB index is indicated by startingPRB; the number of OFDM symbols of a second frequency hopping unit is $N-\lfloor N/2 \rfloor$, and the configuration of a PRB index is indicated by secondPRB.

Method 2: for a PUCCH that has a length of N OFDM symbols, two transmissions are repeated within a slot, and each transmission corresponds to one frequency hopping unit. As shown in FIG. 2k, the number of OFDM symbols of a first frequency hopping unit is N, and the configuration of a PRB index is indicated by startingPRB; the number of OFDM symbols of a second frequency hopping unit is also N, and the configuration of a PRB index is indicated by secondPRB.

Figure 3:
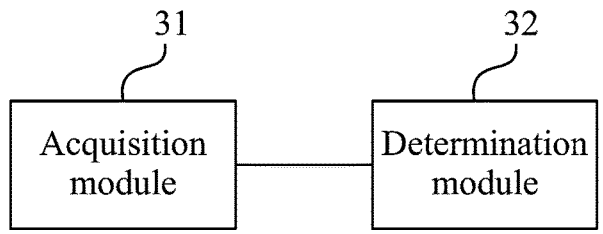
FIG. 3 is a structure diagram of a configuration apparatus according to an embodiment of the present application.

In an exemplary embodiment, the present application provides a configuration apparatus. FIG. 3 is a structure diagram of a configuration apparatus according to an embodiment of the present application, and the apparatus is integrated into a first communication node. Referring to FIG. 3, the apparatus includes: an acquisition module 31 configured to acquire transmission indication information; and a determination module 32 configured to determine a spatial relation associated with an uplink control channel corresponding to the transmission indication information during repeated transmissions of the uplink control channel The configuration apparatus provided by the present embodiment is used to implement the configuration method shown in FIG. 1. The configuration apparatus provided in this embodiment has similar implementation principles and technical effects to the configuration method shown in FIG. 1, which are not repeated here.

Based on the preceding embodiments, variant embodiments of the preceding embodiments are provided. It is to be noted here that for ease of description, only differences from the preceding embodiments are described in the variant embodiments.

In one embodiment, the transmission indication information includes one or more of radio resource control (RRC) signaling, a media access control-control element, or downlink control information, and the uplink control channel includes a physical uplink control channel.

In one embodiment, the determination module 32 is configured to include one or more of the following.

One or more spatial relations associated with uplink transmission are determined according to one or more states that are activated by a media access control-control element included in the transmission indication information and activated for a physical uplink control channel (PUCCH) resource and a PUCCH resource for transmission of the uplink control channel indicated by the downlink control information; or one or more spatial relations associated with uplink transmission are determined according to group identification information activated by a media access control-control element included in the transmission indication information and a PUCCH resource for transmission of the uplink control channel indicated by the downlink control information.

The group identification information is identification information of a group formed by grouping higher-layer parameters indicating spatial relations, and one or more spatial relations are included within the group.

In one embodiment, in a case where the uplink control channel is associated with at least two spatial relations during repeated transmissions of the uplink control channel and is configured with inter-slot frequency hopping or no frequency hopping, the matching manner for spatial relations when the uplink control channel performs repeated transmissions is determined according to an actual transmission occasion index.

In one embodiment, a starting spatial relation of the uplink control channel in a group including even slots is the same as a starting spatial relation of the uplink control channel in a group including odd slots, and each intra-group spatial relation is matched in a sequential order or in a cyclical order according to an actual transmission occasion index; or a starting spatial relation of the uplink control channel in a group including even slots is different from a starting spatial relation of the uplink control channel in a group including odd slots, and each intra-group spatial relation is matched in a sequential order or in a cyclical order according to an actual transmission occasion index.

In one embodiment, in a case where the number of the associated spatial relations is two, the starting spatial relation of the uplink control channel in the group including even slots is the same as the starting spatial relation of the uplink control channel in the group including odd slots includes:

the starting spatial relation of the uplink control channel in the group including even slots and the starting spatial relation of the uplink control channel in the group including odd slots are a first spatial relation; or the starting spatial relation of the uplink control channel in the group including even slots and the starting spatial relation of the uplink control channel in the group including odd slots are a second spatial relation.

In one embodiment, in a case where the number of the associated spatial relations is two, the starting spatial relation of the uplink control channel in the group including even slots is different from the starting spatial relation of the uplink control channel in the group including odd slots includes:

the starting spatial relation of the uplink control channel in the group including even slots is a first spatial relation, and the starting spatial relation of the uplink control channel in the group including odd slots is a second spatial relation; or the starting spatial relation of the uplink control channel in the group including even slots is a second spatial relation, and the starting spatial relation of the uplink control channel in the group including odd slots is a first spatial relation.

In one embodiment, the number of transmissions of different spatial relations is the same, and the number of transmissions is the sum of the number of transmissions of a spatial relation in the group including even slots and the number of transmissions of the same spatial relation in the group including odd slots.

In one embodiment, in a case where the uplink control channel performs repeated transmissions N+M times and the number of the associated spatial relations is two, the number of transmissions of the first spatial relation in the group including even slots is $\lfloor N/2 \rfloor$, the number of transmissions of the second spatial relation in the group including even slots is $N-\lfloor N/2 \rfloor$, the number of transmissions of the first spatial relation in the group including odd slots is $M-\lfloor M/2 \rfloor$, and the number of transmissions of the second spatial relation in the group including odd slots is $\lfloor M/2 \rfloor$. The number of transmissions in even slots is N, and the number of transmissions in odd slots is M. N and M are positive integers.

In one embodiment, in a case where the uplink control channel performs repeated transmissions N+M times and the number of the associated spatial relations is two, the number of transmissions of the first spatial relation in the group including even slots is $N-\lfloor N/2 \rfloor$, the number of transmissions of the second spatial relation in the group including even slots is $\lfloor N/2 \rfloor$, the number of transmissions of the first spatial relation in the group including odd slots is $\lfloor M/2 \rfloor$, and the number of transmissions of the second spatial relation in the group including odd slots is $M-\lfloor M/2 \rfloor$. The number of transmissions in even slots is N, and the number of transmissions in odd slots is M. N and M are positive integers.

In one embodiment, in a case where the uplink control channel is associated with at least two spatial relations and is configured with inter-slot frequency hopping or no frequency hopping, a matching manner for spatial relations associated with the uplink control channel when the uplink control channel performs repeated transmissions is determined according to an absolute slot index.

In one embodiment, an even slot and an odd slot correspond to different spatial relations associated with the uplink control channel, respectively.

In one embodiment, in a case where the number of the associated spatial relations is two, the even slot and the odd slot correspond to different spatial relations associated with the uplink control channel, respectively, includes:
  the even slot is associated with the first spatial relation, and the odd slot is associated with the second spatial relation; or
  the even slot is associated with the second spatial relation, and the odd slot is associated with the first spatial relation.

In one embodiment, determining the spatial relations associated with the uplink control channel according to the absolute slot index includes:
  grouping transmission slots starting from a starting transmission slot, each group including M slots, and M being greater than or equal to 2.

An even-numbered group corresponds to the first spatial relation, and an odd-numbered group corresponds to the second spatial relation; or
  an even-numbered group corresponds to the second spatial relation, and an odd-numbered group corresponds to the first spatial relation.

In one embodiment, the number of repetitions of the uplink control channel is semi-statically indicated by a higher-layer parameter, dynamically indicated by downlink control signaling, or dynamically indicated by a combination of a higher-layer parameter and downlink control signaling.

In one embodiment, in a case where a higher-layer parameter indicates that the number of repetitions is 1 and the sum of a starting symbol position, a transmission interval, and 2 times a duration of the uplink control channel is less than or equal to a slot symbol length, the uplink control channel is transmitted repeatedly within a slot;
  in a case where a higher-layer parameter indicates that the number of repetitions is 1 and the sum of a starting symbol position, a transmission interval, and 2 times a duration of the uplink control channel is greater than a slot symbol length, the uplink control channel is not transmitted repeatedly; or
  in a case where a higher-layer parameter indicates that the number of repetitions is greater than or equal to 2, the uplink control channel is transmitted repeatedly between slots.

The transmission interval is a symbol interval between two repeated transmissions of a PUCCH, and the transmission interval is semi-statically indicated by a higher-layer parameter or dynamically indicated by downlink control signaling. In a case where the transmission interval is not indicated, the value of the transmission interval is a set value.

In one embodiment, in a case where a higher-layer parameter indicates that the number of repetitions is 1 and the number of repetitions of the uplink control channel indicated by downlink control signaling is 1, the uplink control channel is not transmitted repeatedly;
  in a case where a higher-layer parameter indicates that the number of repetitions is 1 and the number of repetitions of the uplink control channel indicated by downlink control signaling is 2, the uplink control channel is transmitted repeatedly within a slot; or
  in a case where a higher-layer parameter indicates that the number of repetitions is not 1 or the number of repetitions of the uplink control channel indicated by downlink control signaling is not 1 or 2, the uplink control channel is transmitted repeatedly between slots, and the number of repetitions of the uplink control channel is indicated by a higher-layer parameter or downlink control signaling.

In one embodiment, in a case where downlink control signaling indicates that the number of repetitions is 1 and the sum of a starting symbol, a transmission interval, and 2 times a duration of the uplink control channel is less than or equal to a slot symbol length, the uplink control channel is transmitted repeatedly within a slot;
  in a case where downlink control signaling indicates that the number of repetitions is 1 and the sum of a starting symbol position, a transmission interval, and 2 times a duration of the uplink control channel is greater than a slot symbol length, the uplink control channel is not transmitted repeatedly; or
  in a case where the value of downlink control signaling is greater than or equal to 2, the uplink control channel is transmitted repeatedly between slots.

The transmission interval is a symbol interval between two repeated transmissions of a PUCCH, and the transmission interval is semi-statically indicated by a higher-layer parameter or dynamically indicated by downlink control signaling. In a case where the transmission interval is not indicated, the value of the transmission interval is a set value.

In one embodiment, in a case where the uplink control channel is configured with intra-slot frequency hopping and configured to be transmitted repeatedly within a slot, frequency hopping is performed within the uplink control channel; or in a case where the uplink control channel is configured with intra-slot frequency hopping and configured to be transmitted repeatedly within a slot, frequency hopping is performed between uplink control channels.

In one embodiment, in a case where the uplink control channel is configured with intra-slot frequency hopping and configured to be transmitted repeatedly between slots, a unit of spatial relation matching is a frequency hopping unit or a slot.

Figure 4:
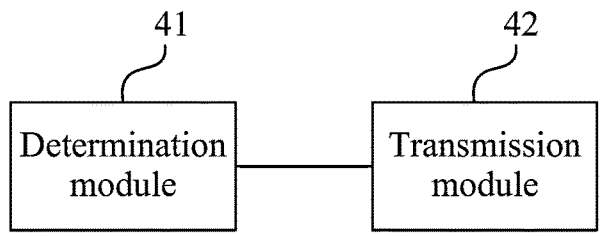
FIG. 4 is another structure diagram of a configuration apparatus according to an embodiment of the present application.

In an exemplary embodiment, the present application provides a configuration apparatus. FIG. 4 is a structure diagram of another configuration apparatus according to an embodiment of the present application, and the apparatus is integrated into a second communication node. Referring to FIG. 4, the apparatus includes: a determination module 41 configured to determine transmission indication information, the transmission indication information indicating a spatial relation associated with an uplink control channel during repeated transmissions of the uplink control channel; and a transmission module 42 configured to transmit the transmission indication information.

The configuration apparatus provided by the present embodiment is used to implement the configuration method shown in FIG. 2. The configuration apparatus provided in this embodiment has similar implementation principles and technical effects to the configuration method shown in FIG. 2, which are not repeated here.

Based on the preceding embodiments, variant embodiments of the preceding embodiments are provided. It is to be noted here that for ease of description, only differences from the preceding embodiments are described in the variant embodiments.

In one embodiment, the transmission indication information includes one or more of radio resource control (RRC) signaling, a media access control-control element, or downlink control information, and the uplink control channel includes a physical uplink control channel.

In one embodiment, one or more states are activated by the media access control-control element included in the transmission indication information and activated for a physical uplink control channel (PUCCH) resource, and a PUCCH resource is for transmission of the uplink control channel indicated by the downlink control information; or group identification information is activated by the media access control-control element included in the transmission indication information, and a PUCCH resource is for transmission of the uplink control channel indicated by the downlink control information. The group identification information is identification information of a group formed by grouping higher-layer parameters indicating spatial relations, and one or more spatial relations are included within the group.

In one embodiment, in a case where the uplink control channel is associated with at least two spatial relations and is configured with inter-slot frequency hopping or no frequency hopping, a matching manner for spatial relations when the uplink control channel performs repeated transmissions is determined according to an actual transmission occasion index.

In one embodiment, a starting spatial relation of the uplink control channel in a group including even slots is the same as a starting spatial relation of the uplink control channel in a group including odd slots, and each intra-group spatial relation is matched in a sequential order or in a cyclical order according to an actual transmission occasion index; or
 a starting spatial relation of the uplink control channel in a group including even slots is different from a starting spatial relation of the uplink control channel in a group including odd slots, and each intra-group spatial relation is matched in a sequential order or in a cyclical order according to an actual transmission occasion index.

In one embodiment, in a case where the number of the associated spatial relations is two, the starting spatial relation of the uplink control channel in the group including even slots is the same as the starting spatial relation of the uplink control channel in the group including odd slots includes:
 the starting spatial relation of the uplink control channel in the group including even slots and the starting spatial relation of the uplink control channel in the group including odd slots are a first spatial relation; or the starting spatial relation of the uplink control channel in the group including even slots and the starting spatial relation of the uplink control channel in the group including odd slots are a second spatial relation.

In one embodiment, in a case where the number of the associated spatial relations is two, the starting spatial relation of the uplink control channel in the group including even slots is different from the starting spatial relation of the uplink control channel in the group including odd slots includes:
 the starting spatial relation of the uplink control channel in the group including even slots is a first spatial relation, and the starting spatial relation of the uplink control channel in the group including odd slots is a second spatial relation; or the starting spatial relation of the uplink control channel in the group including even slots is a second spatial relation, and the starting spatial relation of the uplink control channel in the group including odd slots is a first spatial relation.

In one embodiment, the number of transmissions of different spatial relations is the same, and the number of transmissions is the sum of the number of transmissions of a spatial relation in the group including even slots and the number of transmissions of the same spatial relation in the group including odd slots.

In one embodiment, in a case where the uplink control channel performs repeated transmissions N+M times and the number of the associated spatial relations is two, the number of transmissions of the first spatial relation in the group including even slots is $\lfloor N/2 \rfloor$, the number of transmissions of the second spatial relation in the group including even slots is $N-\lfloor N/2 \rfloor$, the number of transmissions of the first spatial relation in the group including odd slots is $M-\lfloor M/2 \rfloor$, and the number of transmissions of the second spatial relation in the group including odd slots is $\lfloor M/2 \rfloor$. The number of transmissions in even slots is N, and the number of transmissions in odd slots is M. N and M are positive integers.

In one embodiment, in a case where the uplink control channel performs repeated transmissions N+M times and the number of the associated spatial relations is two, the number of transmissions of the first spatial relation in the group including even slots is $N-\lfloor N/2 \rfloor$, the number of transmissions of the second spatial relation in the group including even slots is $\lfloor N/2 \rfloor$, the number of transmissions of the first spatial relation in the group including odd slots is $\lfloor M/2 \rfloor$, and the number of transmissions of the second spatial relation in the group including odd slots is $M-\lfloor M/2 \rfloor$. The number of transmissions in even slots is N, and the number of transmissions in odd slots is M. N and M are positive integers.

In one embodiment, in a case where the uplink control channel is associated with at least two spatial relations and is configured with inter-slot frequency hopping or no frequency hopping, the spatial relations associated with the uplink control channel and a matching manner for a matching relationship of repeated transmissions are determined according to an absolute slot index.

In one embodiment, an even slot and an odd slot correspond to different spatial relations associated with the uplink control channel, respectively.

In one embodiment, in a case where the number of the associated spatial relations is two, the even slot and the odd slot correspond to different spatial relations associated with the uplink control channel, respectively, includes:
 the even slot is associated with the first spatial relation, and the odd slot is associated with the second spatial relation; or
 the even slot is associated with the second spatial relation, and the odd slot is associated with the first spatial relation.

In one embodiment, determining the spatial relations associated with the uplink control channel according to the absolute slot index includes:
 grouping transmission slots starting from a starting transmission slot, each group including M slots, and M being greater than or equal to 2.

An even-numbered group corresponds to the first spatial relation, and an odd-numbered group corresponds to the second spatial relation; or
  an even-numbered group corresponds to the second spatial relation, and an odd-numbered group corresponds to the first spatial relation.

In one embodiment, the apparatus further includes a first indication module configured to semi-statically indicate the number of repetitions of the uplink control channel using a higher-layer parameter.

In one embodiment, the first indication module semi-statically indicates the number of repetitions of the uplink control channel using the higher-layer parameter, includes one of the following:
  in a case where the uplink control channel is transmitted repeatedly within a slot, the higher-layer parameter indicates that the number of repetitions is 1, and the sum of a starting symbol position, a transmission interval, and 2 times a duration of the uplink control channel is less than or equal to a slot symbol length;
  in a case where the uplink control channel is not transmitted repeatedly, the higher-layer parameter indicates that the number of repetitions is 1, and the sum of a starting symbol position, a transmission interval, and 2 times a duration of the uplink control channel is greater than a slot symbol length; or
  in a case where the uplink control channel is transmitted repeatedly between slots, the higher-layer parameter indicates that the number of repetitions is greater than or equal to 2.

The transmission interval is a symbol interval between two repeated transmissions of a PUCCH, and the transmission interval is semi-statically indicated by a higher-layer parameter or dynamically indicated by downlink control signaling. In a case where the transmission interval is not indicated, the value of the transmission interval is a set value.

In one embodiment, the apparatus further includes a second indication module configured to dynamically indicate the number of repetitions of the uplink control channel using a higher-layer parameter and downlink control signaling.

In one embodiment, the second indicating module dynamically indicates the number of repetitions of the uplink control channel using the higher-layer parameter and the downlink control signaling, includes:
  in a case where the uplink control channel is not transmitted repeatedly, the higher-layer parameter indicates that the number of repetitions is 1 and the number of repetitions of the uplink control channel indicated by the downlink control signaling is 1;
  in a case where the uplink control channel is transmitted repeatedly within a slot, the higher-layer parameter indicates that the number of repetitions is 1, and in a case where the number of repetitions of the uplink control channel indicated by the downlink control signaling is 2, the uplink control channel is transmitted repeatedly within a slot; or
  in a case where the uplink control channel is transmitted repeatedly between slots, the higher-layer parameter indicates that the number of repetitions is not 1 or the number of repetitions of the uplink control channel indicated by the downlink control signaling is not 1 or 2.

In one embodiment, the apparatus further includes a third indication module configured to dynamically indicate the number of repetitions of the uplink control channel using downlink control signaling.

In one embodiment, the third indication module dynamically indicates the number of repetitions of the uplink control channel using the downlink control signaling, includes:
  in a case where the uplink control channel is transmitted repeatedly within a slot, the downlink control signaling indicates that the number of repetitions is 1, and the sum of a starting symbol position, a transmission interval, and 2 times a duration of the uplink control channel is less than or equal to a slot symbol length;
  in a case where the uplink control channel is not transmitted repeatedly, the downlink control signaling indicates that the number of repetitions is 1, and the sum of a starting symbol position, a transmission interval, and 2 times a duration of the uplink control channel is greater than a slot symbol length; or
  in a case where the uplink control channel is transmitted repeatedly between slots, the value of the downlink control signaling is greater than or equal to 2.

The transmission interval is a symbol interval between two repeated transmissions of a PUCCH, and the transmission interval is semi-statically indicated by a higher-layer parameter or dynamically indicated by downlink control signaling. In a case where the transmission interval is not indicated, the value of the transmission interval is a set value.

In one embodiment, in a case where the uplink control channel is configured with intra-slot frequency hopping and configured to be transmitted repeatedly within a slot, frequency hopping is performed within the uplink control channel; or in a case where the uplink control channel is configured with intra-slot frequency hopping and configured to be transmitted repeatedly within a slot, frequency hopping is performed between uplink control channels.

In one embodiment, in a case where the uplink control channel is configured with intra-slot frequency hopping and configured to be transmitted repeatedly between slots, a unit of spatial relation matching is a frequency hopping unit or a slot.

Figure 5:
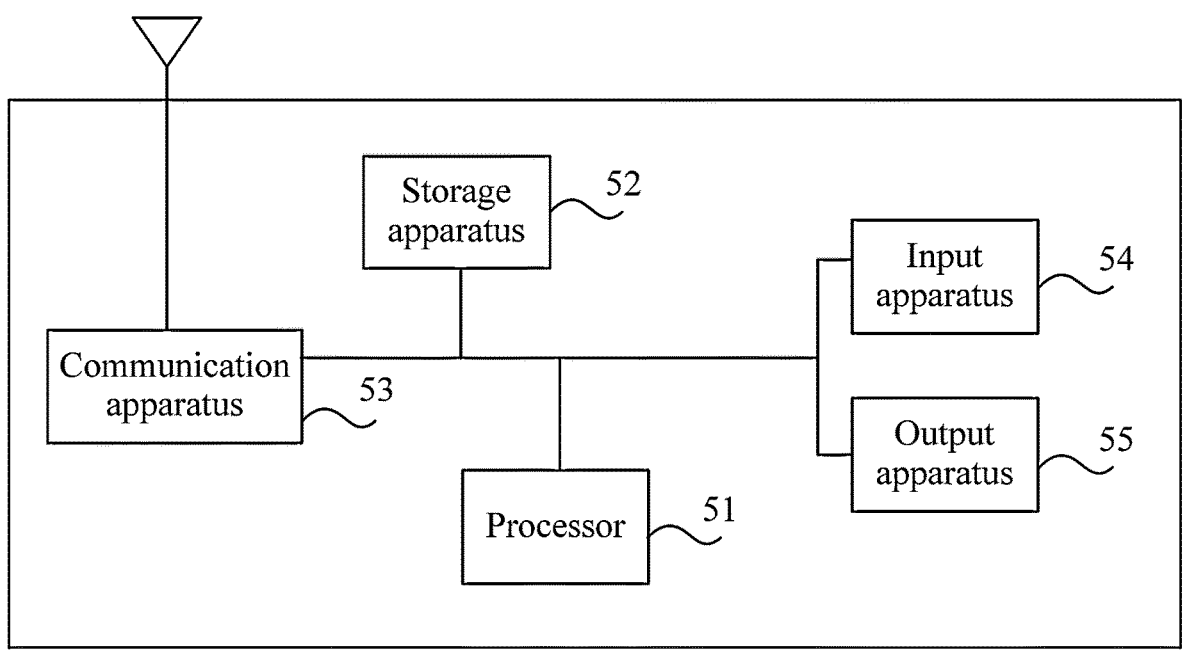
FIG. 5 is a structure diagram of a first communication node according to an embodiment of the present application.

In an exemplary embodiment, an embodiment of the present application further provides a first communication node, and FIG. 5 is a structure diagram of a first communication node according to an embodiment of the present application. As shown in FIG. 5, the first communication node provided by the present application includes one or more processors 51 which, when executed, implement the method described in FIG. 1 of the present application. The first communication node further includes a storage apparatus 52. One or more processors 51 may be provided in the first communication node. In FIG. 5, one processor 51 is used as an example. The storage apparatus 52 is configured to store one or more programs. The one or more programs, when executed by the one or more processors 51, cause the one or more processors 51 to implement the method shown in FIG. 1 of the present application.

The first communication node further includes a communication apparatus 53, an input apparatus 54, and an output apparatus 55.

The processor 51, the storage apparatus 52, the communication apparatus 53, the input apparatus 54, and the output apparatus 55 in the first communication node may be connected via a bus or other means, with connection via a bus as an example in FIG. 5.

The input apparatus 54 may be configured to receive input digital or character information and to generate key signal input related to user settings and function control of the first communication node. The output apparatus 55 may include display devices such as a display screen.

The communication apparatus 53 may include a receiver and a transmitter. The communication apparatus 53 is configured to perform information transceiving and communication under the control of the one or more processors 51. The information includes, but is not limited to, transmission indication information.

The storage apparatus 52, as a computer-readable storage medium, may be configured to store software programs, computer-executable programs and modules such as program instructions/modules (for example, the acquisition module 31 and the determination module 32 in the configuration apparatus) corresponding to the method shown in FIG. 1 of the present application. The storage apparatus 52 may include a program storage region and a data storage region. The program storage region may store an operating system and an application program required by at least one function. The data storage region may store data created depending on the use of the first communication node. Additionally, the storage apparatus 52 may include a high-speed random-access memory and may further include a non-volatile memory, such as at least one disk memory, a flash memory, or another non-volatile solid-state memory. In some examples, the storage apparatus 52 may further include memories which are remotely disposed with respect to the processor 51. These remote memories may be connected to the first communication node via a network. Examples of the above network include, but are not limited to, the Internet, an intranet, a local area network, a mobile communication network, and a combination thereof.

Figure 6:
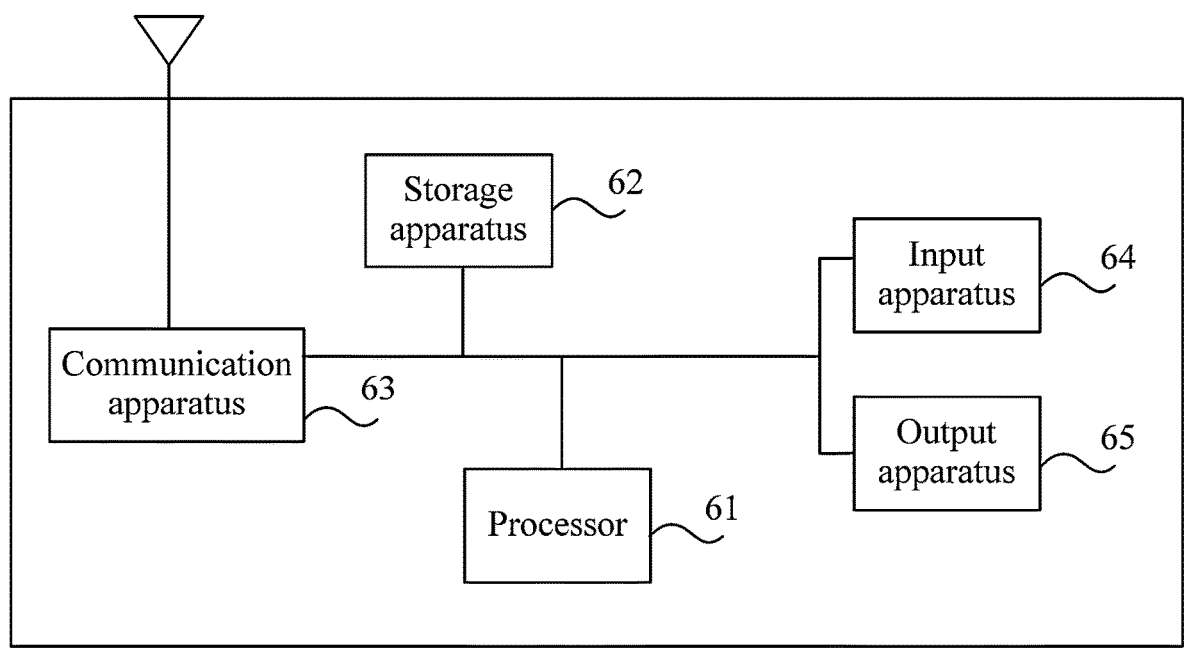
FIG. 6 is a structure diagram of a second communication node according to an embodiment of the present application.

In an exemplary embodiment, an embodiment of the present application further provides a second communication node, and FIG. 6 is a structure diagram of a second communication node according to an embodiment of the present application. As shown in FIG. 6, the second communication node provided by the present application includes one or more processors 61 which, when executed, implement the method described in FIG. 2 of the present application. The second communication node further includes a storage apparatus 62. One or more processors 61 may be provided in the second communication node. In FIG. 6, one processor 61 is used as an example. The storage apparatus 62 is configured to store one or more programs. The one or more programs, when executed by the one or more processors 61, cause the one or more processors 61 to implement the method shown in FIG. 2 of the present application.

The second communication node further includes a communication apparatus 63, an input apparatus 64, and an output apparatus 65.

The processor 61, the storage apparatus 62, the communication apparatus 63, the input apparatus 64, and the output apparatus 65 in the second communication node may be connected via a bus or other means, with connection via a bus as an example in FIG. 6.

The input apparatus 64 may be configured to receive input digital or character information and to generate key signal input related to user settings and function control of the second communication node. The output apparatus 65 may include display devices such as a display screen.

The communication apparatus 63 may include a receiver and a transmitter. The communication apparatus 63 is configured to perform information transceiving and communication under the control of the one or more processors 61. The information includes, but is not limited to, transmission indication information.

The storage apparatus 62, as a computer-readable storage medium, may be configured to store software programs, computer-executable programs and modules such as program instructions/modules (for example, the determination module 41 and the transmission module 42 in the configuration apparatus) corresponding to the method shown in FIG. 2 of the present application. The storage apparatus 62 may include a program storage region and a data storage region. The program storage region may store an operating system and an application program required by at least one function. The data storage region may store data created depending on the use of the second communication node. Additionally, the storage apparatus 62 may include a high-speed random-access memory and may further include a non-volatile memory, such as at least one disk memory, a flash memory, or another non-volatile solid-state memory. In some examples, the storage apparatus 62 may further include memories which are remotely disposed with respect to the processor 61. These remote memories may be connected to the second communication node via a network. Examples of the above network include, but are not limited to, the Internet, an intranet, a local area network, a mobile communication network, and a combination thereof.

A storage medium is further provided in an embodiment of the present application. The storage medium stores a computer program. When the computer program is executed by a processor, any method in the present application is performed. The storage medium stores a computer program. When the computer program is executed by a processor, any configuration method in embodiments of the present application is performed. For example, the configuration method is a configuration method applied to a first communication node and a configuration method applied to a second communication node. The configuration method applied to a first communication node includes: acquiring transmission indication information; and determining a spatial relation associated with an uplink control channel corresponding to the transmission indication information during repeated transmissions of the uplink control channel.

The configuration method applied to a second communication node includes: determining transmission indication information, the transmission indication information indicating a spatial relation associated with an uplink control channel during repeated transmissions of the uplink control channel; and transmitting the transmission indication information.

A computer storage medium in the embodiments of the present application may use any combination of one or more computer-readable mediums. The computer-readable medium may be a computer-readable signal medium or a computer-readable storage medium. The computer-readable storage medium may be, for example, but is not limited to, an electrical, magnetic, optical, electromagnetic, infrared, or semiconductor system, apparatus, or device, or any combination thereof. More specific examples of the computer-readable storage medium include (a non-exhaustive list): an electrical connection having one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical storage element, a magnetic storage device, or any suitable combination thereof. The computer-readable storage medium may be any tangible medium including or storing a program. The program may be used by or used in conjunction with an instruction execution system, apparatus, or element.

The computer-readable signal medium may include a data signal propagated in a baseband or as part of a carrier. The data signal carries computer-readable program codes. The data signal propagated in this manner may be in multiple forms and includes, and is not limited to, an electromagnetic signal, an optical signal, or any suitable combination thereof. The computer-readable signal medium may further be any computer-readable medium other than the computer-readable storage medium. The computer-readable medium may send, propagate, or transmit the program used by or used in conjunction with the instruction execution system, apparatus, or element.

The program codes included on the computer-readable medium may be transmitted on any suitable medium including, but not limited to, a wireless medium, a wire, an optical cable, a radio frequency (RF) and the like or transmitted on any suitable combination thereof.

Computer program codes for performing the operations of the present application may be written in one or more programming languages or a combination thereof, including object-oriented programming languages such as Java, Smalltalk, C++, as well as conventional procedural programming languages such as "C" or similar programming languages. The program codes may be executed entirely on a user computer, partly on a user computer, as a stand-alone software package, partly on a user computer and partly on a remote computer, or entirely on a remote computer or a server. In the case relating to the remote computer, the remote computer may be connected to the user computer via any kind of network including a local area network (LAN) or a wide area network (WAN), or may be connected to an external computer (for example, via the Internet through an Internet service provider).

The above are only exemplary embodiments of the present application and not intended to limit the scope of the present application.

It is to be understood by those skilled in the art that the term "user equipment" covers any suitable type of wireless user equipment, for example, a mobile phone, a portable data processing apparatus, a portable web browser or a vehicle-mounted mobile station.

In general, multiple embodiments of the present application may be implemented in hardware or special-purpose circuits, software, logic, or any combination thereof. For example, some aspects may be implemented in hardware while other aspects may be implemented in firmware or software that may be executed by a controller, a microprocessor, or another computing apparatus, though the present application is not limited thereto.

The embodiments of the present application may be implemented by computer program instructions executed by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination of program steps with logic circuits, modules, and functions. The computer program may be stored in a memory. The memory may be of any type suitable for the local technical environment and may be implemented using any suitable data storage technology, such as, but not limited to, a read-only memory (ROM), a random-access memory (RAM) and an optical memory device and system (a digital video disc (DVD) or a compact disc (CD)). A computer-readable medium may include a non-transitory storage medium. A data processor may be of any type appropriate for the local technical environment, such as, but not limited to, a general-purpose computer, a special-purpose computer, a microprocessor, a digital signal processor (DSP), an application-specific integrated circuit (ASIC), a field-programmable gate array (FPGA), and a processor based on multi-core processor architecture.

What is claimed is:

1. A configuration method, comprising:
   acquiring transmission indication information; and
   determining a spatial relation associated with an uplink control channel corresponding to the transmission indication information during repeated transmissions of the uplink control channel;
   wherein the transmission indication information comprises at least one of radio resource control (RRC) signaling, a media access control-control element, or downlink control information;
   wherein in a case where the uplink control channel is associated with at least two spatial relations during the repeated transmissions of the uplink control channel and is configured with inter-slot frequency hopping or no frequency hopping, a matching manner for spatial relations during the repeated transmissions of the uplink control channel is determined according to an actual transmission occasion index;
   wherein in a case where the uplink control channel is associated with two spatial relations,
   a starting spatial relation of the uplink control channel in a group comprising even slots and a starting spatial relation of the uplink control channel in a group comprising odd slots are each a first spatial relation; or a starting spatial relation of the uplink control channel in a group comprising even slots and a starring spatial relation of the uplink control channel in a group comprising odd slots are each a second spatial relation; or a starting spatial relation of the uplink control channel in a group comprising even slots is a first spatial relation and a starting spatial relation of the uplink control channel in a group comprising odd slots is a second spatial relation; or a starting spatial relation of the uplink control channel in a group comprising even slots is a second spatial relation and a starting spatial relation of the uplink control channel in a group comprising odd slots is a first spatial relation;
   wherein a number of transmissions of different spatial relations is the same, and the number of transmissions is a sum of a number of transmissions of one spatial relation in the group comprising even slots and a number of transmissions of the one spatial relation in the group comprising odd slots.

2. The method of claim 1, wherein the determining the spatial relation associated with the uplink control channel corresponding to the transmission indication information during the repeated transmissions of the uplink control channel, comprises at least one of the following:
   determining at least one spatial relation associated with the uplink control channel during uplink transmission of the uplink control channel according to at least one state that is activated for a physical uplink control channel (PUCCH) resource and by a media access control-control element included in the transmission indication information and a PUCCH resource for transmission of the uplink control channel indicated by downlink control information; or determining at least one spatial relation associated with the uplink control channel during uplink transmission of the uplink control channel according to group identification information activated by a media access control-control element included in the transmission indication information and a PUCCH resource for transmission of the uplink control channel indicated by downlink control information;

wherein the group identification information is identification information of a group formed by grouping higher-layer parameters indicating spatial relations, and at least one spatial relation is included within the group.

3. The method of claim 1, wherein in a case where the number of the repeated transmissions of the uplink control channel is N+M and the uplink control channel is associated with two spatial relations, a number of transmissions of a first spatial relation in the group comprising even slots is $\lfloor N/2 \rfloor$, a number of transmissions of a second spatial relation in the group comprising even slots is $N-\lfloor N/2 \rfloor$, a number of transmissions of the first spatial relation in the group comprising odd slots is $M-\lfloor M/2 \rfloor$, and a number of transmissions of the second spatial relation in the group comprising odd slots is $\lfloor M/2 \rfloor$; or a number of transmissions of a first spatial relation in the group comprising even slots is $N-\lfloor N/2 \rfloor$, a number of transmissions of a second spatial relation in the group comprising even slots is $\lfloor N/2 \rfloor$, a number of transmissions of the first spatial relation in the group comprising odd slots is $\lfloor M/2 \rfloor$, and a number of transmissions of the second spatial relation in the group comprising odd slots is $M-\lfloor M/2 \rfloor$, wherein a number of transmissions in even slots is N and a number of transmissions in odd slots is M, and N and M are positive integers.

4. The method of claim 1, wherein a number of repetitions of the uplink control channel is semi-statically indicated by a higher-layer parameter, dynamically indicated by downlink control signaling, or dynamically indicated by a combination of a higher-layer parameter and downlink control signaling.

5. The method of claim 1, wherein, in a case where a higher-layer parameter indicates that a number of repetitions of the uplink control channel is 1, and a sum of a starting symbol position, a transmission interval, and 2 times a duration of the uplink control channel is less than or equal to a slot symbol length, the uplink control channel is transmitted repeatedly within a slot;

in a case where a higher-layer parameter indicates that a number of repetitions of the uplink control channel is 1, and a sum of a starting symbol position, a transmission interval, and 2 times a duration of the uplink control channel is greater than a slot symbol length, the uplink control channel is not transmitted repeatedly; or in a case where a higher-layer parameter indicates that a number of repetitions of the uplink control channel is greater than or equal to 2, the uplink control channel is transmitted repeatedly between slots;

wherein the transmission interval is a symbol interval between two repeated transmissions of a PUCCH, the transmission interval is semi-statically indicated by a higher-layer parameter or dynamically indicated by downlink control signaling, and in a case where the transmission interval is not indicated, a value of the transmission interval is a set value.

6. The method of claim 1, wherein, in a case where a higher-layer parameter indicates that a number of repetitions of the uplink control channel is 1 and a number of repetitions of the uplink control channel indicated by downlink control signaling is 1, the uplink control channel is not transmitted repeatedly;

in a case where a higher-layer parameter indicates that a number of repetitions of the uplink control channel is 1 and a number of repetitions of the uplink control channel indicated by downlink control signaling is 2, the uplink control channel is transmitted repeatedly within a slot; or in a case where a higher-layer parameter indicates that a number of repetitions of the uplink control channel is not 1 or a number of repetitions of the uplink control channel indicated by downlink control signaling is not 1 or 2, the uplink control channel is transmitted repeatedly between slots, and the number of repetitions of the uplink control channel is indicated by the higher-layer parameter or the downlink control signaling.

7. The method of claim 1, wherein, in a case where downlink control signaling indicates that a number of repetitions of the uplink control channel is 1 and a sum of a starting symbol position, a transmission interval, and 2 times a duration of the uplink control channel is less than or equal to a slot symbol length, the uplink control channel is transmitted repeatedly within a slot;

in a case where downlink control signaling indicates that a number of repetitions of the uplink control channel is 1 and a sum of a starting symbol position, a transmission interval, and 2 times a duration of the uplink control channel is greater than a slot symbol length, the uplink control channel is not transmitted repeatedly; or in a case where a value of downlink control signaling is greater than or equal to 2, the uplink control channel is transmitted repeatedly between slots;

wherein the transmission interval is a symbol interval between two repeated transmissions of a PUCCH, the transmission interval is semi-statically indicated by a higher-layer parameter or dynamically indicated by downlink control signaling, and in a case where the transmission interval is not indicated, a value of the transmission interval is a set value.

8. The method of claim 1, wherein in a case where the uplink control channel is configured with intra-slot frequency hopping and configured to be transmitted repeatedly within a slot, frequency hopping is performed within the uplink control channel; or in a case where the uplink control channel is configured with intra-slot frequency hopping and configured to be transmitted repeatedly within a slot, frequency hopping is performed between uplink control channels.

9. The method of claim 1, wherein in a case where the uplink control channel is configured with intra-slot frequency hopping and configured to be transmitted repeatedly between slots, a unit of spatial relation matching is a frequency hopping unit or a slot.

10. A first communication node, comprising: at least one processor, wherein the at least one processor, when executed, implements the configuration method of claim 1.

11. A non-transitory storage medium storing a computer program which, when executed by a processor, causes the processor to perform the configuration method of claim 1.

12. A configuration method, comprising:
- determining transmission indication information, wherein the transmission indication information indicates a spatial relation associated with an uplink control channel during repeated transmissions of the uplink control channel; and
- transmitting the transmission indication information;
- wherein the transmission indication information comprises at least one of radio resource control (RRC) signaling, a media access control-control element, or downlink control information;
- wherein in a case where the uplink control channel is associated with at least two spatial relations during the repeated transmissions of the uplink control channel and is configured with inter-slot frequency hopping or no frequency hopping, a matching manner for spatial relations during the repeated transmissions of the uplink control channel is determined according to an actual transmission occasion index;
- wherein in a case where the uplink control channel is associated with two spatial relations,
- a starting spatial relation of the uplink control channel in a group comprising even slots and a starting spatial relation of the uplink control channel in a group comprising odd slots are each a first spatial relation; or a starting spatial relation of the uplink control channel in a group comprising even slots and a starring spatial relation of the uplink control channel in a group comprising odd slots are each a second spatial relation; or
- a starting spatial relation of the uplink control channel in a group comprising even slots is a first spatial relation and a starting spatial relation of the uplink control channel in a group comprising odd slots is a second spatial relation; or a starting spatial relation of the uplink control channel in a group comprising even slots is a second spatial relation and a starting spatial relation of the uplink control channel in a group comprising odd slots is a first spatial relation;
- wherein a number of transmissions of different spatial relations is the same, and the number of transmissions is a sum of a number of transmissions of one spatial relation in the group comprising even slots and a number of transmissions of one spatial relation in the group comprising odd slots.

13. A second communication node, comprising: at least one processor, wherein the at least one processor, when executed, implements the configuration method of claim 12.

14. A non-transitory storage medium storing a computer program which, when executed by a professor, causes the processor to perform the configuration method of claim 12.

* * * * *